United States Patent
Ito et al.

(10) Patent No.: US 9,513,719 B2
(45) Date of Patent: Dec. 6, 2016

(54) PEN PRESSURE DETECTING MODULE AND POSITION INDICATOR

(71) Applicant: Wacom Co., Ltd., Saitama (JP)

(72) Inventors: Masamitsu Ito, Saitama (JP); Ryoji Kamiyama, Ibaraki (JP); Shigeru Yamashita, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/259,049

(22) Filed: Apr. 22, 2014

(65) Prior Publication Data

US 2015/0035807 A1 Feb. 5, 2015

(30) Foreign Application Priority Data

Aug. 3, 2013 (JP) ................................. 2013-161916

(51) Int. Cl.
*G06F 3/044* (2006.01)
*G06F 3/0354* (2013.01)

(52) U.S. Cl.
CPC ........... *G06F 3/03545* (2013.01); *G06F 3/044* (2013.01)

(58) Field of Classification Search
None
See application file for complete search history.

(56) References Cited

U.S. PATENT DOCUMENTS

| 5,206,785 A | 4/1993 | Hukashima |
| 2011/0219892 A1 | 9/2011 | Fukushima et al. |
| 2013/0193532 A1* | 8/2013 | Horie ..................... H01L 29/84 257/415 |
| 2013/0199311 A1* | 8/2013 | Horie ..................... G01L 1/142 73/862.626 |

FOREIGN PATENT DOCUMENTS

| EP | 2 624 104 A2 | 8/2013 |
| JP | 2011-186803 A | 9/2011 |

OTHER PUBLICATIONS

Extended European Search Report dated Mar. 11, 2015, for corresponding EP Application No. 14177576.7-1972 / 2833244, 6 pages.

* cited by examiner

*Primary Examiner* — Jason Olson
*Assistant Examiner* — Krishna Neupane
(74) *Attorney, Agent, or Firm* — Seed Intellectual Property Law Group LLP

(57) ABSTRACT

Disclosed herein is a pen pressure detecting module housed in a position indicator, the position indicator having a pen shape and being capable of detecting a pressure applied to a tip portion of the position indicator. The pen pressure detecting module includes a pressure sensing device, a first holder, and a second holder. The pressure sensing device senses the pressure based on a change in a capacitance formed between a first electrode and a second electrode disposed so as to be opposed to each other, which capacitance changes so as to correspond to the pressure that is transmitted to the first electrode. The second holder is housed in the first holder, and the pressure sensing device is disposed so as to sense the pressure applied to the second holder. An engaging portion engaged with a pressure transmitting member that transmits the pressure is formed in the second holder.

21 Claims, 12 Drawing Sheets

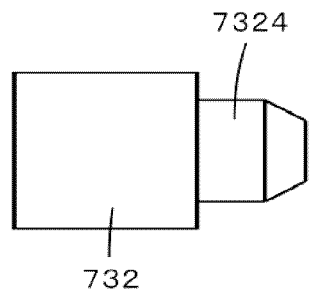
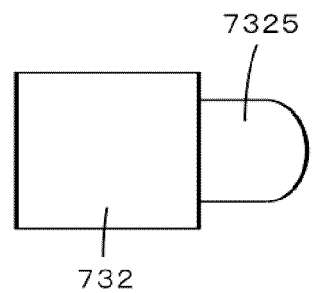
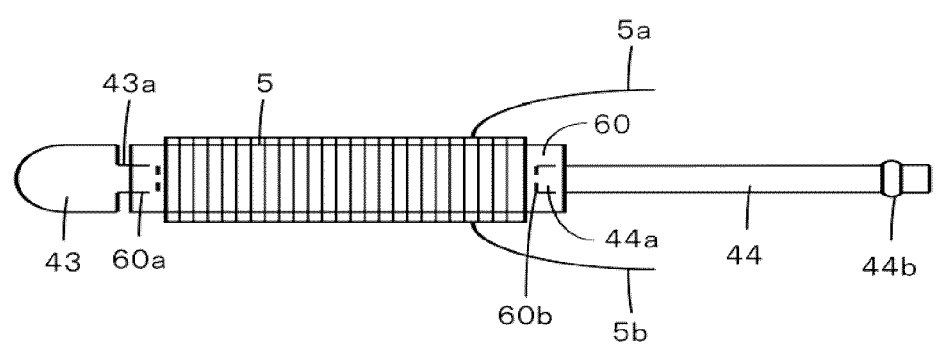

PEN PRESSURE DETECTING MODULE AND POSITION INDICATOR

BACKGROUND

Technical Field

The present disclosure relates to a position indicator having a pen pressure detecting function, the position indicator being used in conjunction with a position detecting device, a pen pressure detecting module used in the position indicator, and a position indicator using the pen pressure detecting module.

Description of the Related Art

A position input device has recently been used as an input device for a tablet type PC (personal computer), a portable apparatus, or the like. This position input device includes, for example, a position indicator formed in the shape of a pen and a position detecting device having an input surface on which pointing operations and the input of characters, figures, and the like are performed by using the position indicator.

In related art, as a pen type of position indicator of this kind, a position indicator for an electromagnetic induction type of position detecting device is well known. The electromagnetic induction type position indicator has a resonance circuit formed by connecting a capacitor for resonance to a coil wound around a ferrite core. The position indicator indicates a position on the position detecting device by transmitting a resonance signal obtained in the resonance circuit to the position detecting device.

The pen type of position indicator of this kind in related art is also configured to have a function of detecting a pressure (pen pressure) applied to a tip portion (pen point) of a core body and transmitting the pressure (pen pressure) to the position detecting device. In this case, for detecting the pen pressure, a method is known which uses a mechanism that changes the inductance of the coil forming the resonance circuit according to the pen pressure, or a method is known which uses a mechanism that changes the capacitance of the capacitor forming the resonance circuit according to the pen pressure.

FIG. 19A is a general perspective view of the example of constitution of the pen pressure detecting mechanism part. FIG. 19B is a sectional view taken along a line A-A of FIG. 19A, and is a longitudinal sectional view of the pen pressure detecting mechanism part.

Figure 19A:
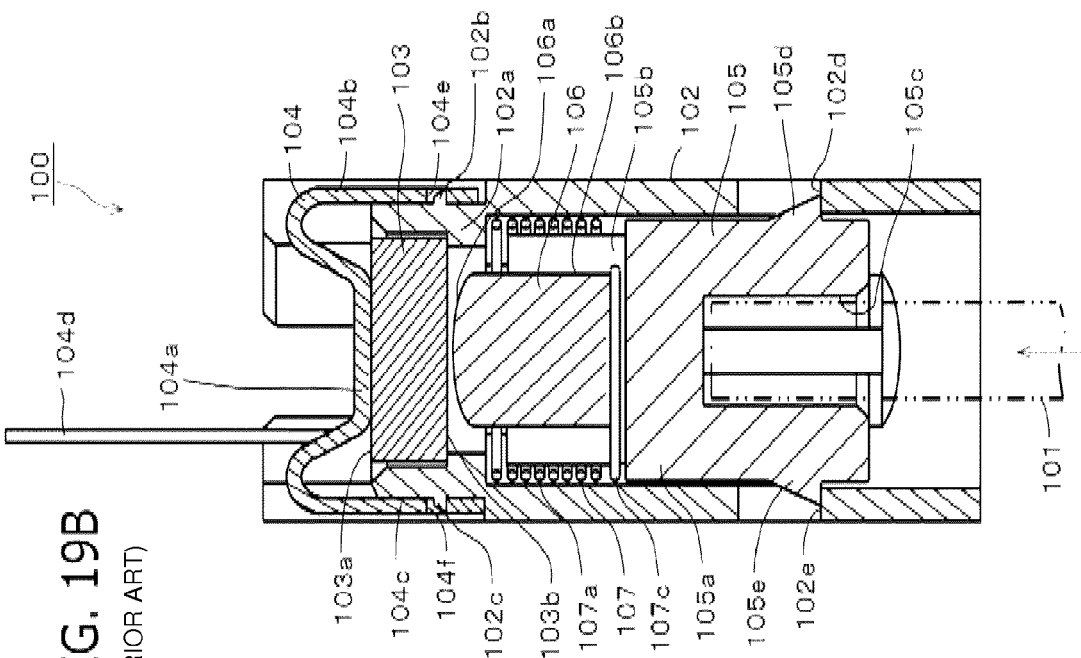
FIGS. 19A and 19B show an example of a constitution in related art of a pen pressure detecting mechanism part of a variable capacitance capacitor type that changes the capacitance of a capacitor forming a resonance circuit of a position indicator according to pen pressure. The example is described in Japanese Patent Laid-Open No. 2011-186803.
Figure 19B:
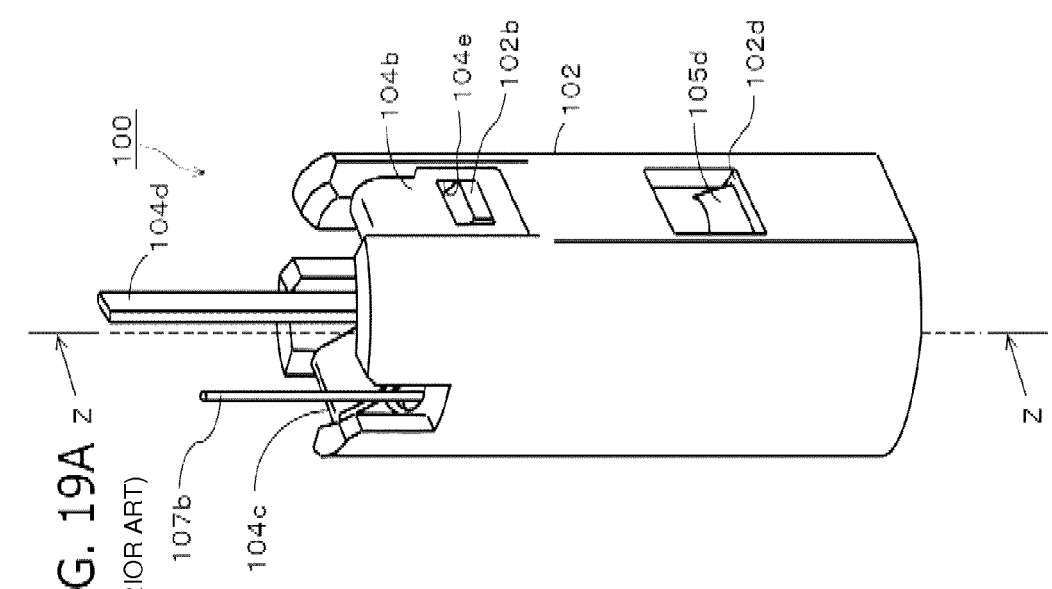

The pen pressure detecting mechanism part 100 in the example of FIGS. 19A and 19B uses, as a pressure sensing portion, a variable capacitance capacitor that changes capacitance based on a pressure (pen pressure) applied to a core body 101 (see alternate long and short dashed lines in FIG. 19B) of the position indicator. The position indicator detects the pen pressure applied to the core body 101 on the basis of the change in the capacitance of the variable capacitance capacitor, and transmits the detected pen pressure to a position detecting device.

As shown in FIG. 19A and FIG. 19B, the variable capacitance capacitor acting as the pressure sensing portion of the pen pressure detecting mechanism part 100 includes a dielectric 103, a terminal member 104, a retaining member 105, a conductive member 106, and an elastic member 107 within a cylindrical holder 102 formed of a resin, for example.

The dielectric 103, for example, has substantially a disk shape. The dielectric 103 has a first surface portion 103a and a second surface portion 103b, the second surface portion 103b being opposed to the first surface portion 103a so as to be substantially parallel to the first surface portion 103a. As shown in FIG. 19B, the dielectric 103 is mounted on a flange portion 102a of the holder 102 with the second surface portion 103b facing in an axial direction of the holder 102 toward an end of the holder 102 at which an end of the core body 101 is present.

The terminal member 104 is formed of a conductive metal. The terminal member 104 has a flat portion 104a engaged with the surface portion 103a of the dielectric 103, two locking portions 104b and 104c formed so as to be continuous from the flat portion 104a, and a lead piece 104d similarly formed so as to be continuous from the flat portion 104a.

As shown in FIG. 19A and FIG. 19B, the opening portions 104e and 104f of the two locking portions 104b and 104c of the terminal member 104 are locked to locking pawl portions 102b and 102c of the holder 102, whereby the terminal member 104 is fixed to the holder 102.

The lead piece 104d of the terminal member 104 is connected to a contact portion of a printed board (not shown) disposed on an opposite side from the core body 101. The lead piece 104d of the terminal member 104 forms a first electrode of the variable capacitance capacitor.

The retaining member 105 has a base portion 105a having an outside diameter slightly smaller than the inside diameter of a hollow portion of the holder 102. An engaging recessed portion 105c (see FIG. 19B) recessed in substantially a cylindrical shape is provided in the base portion 105a. An end portion in the axial direction of the core body 101 is press-fitted into the engaging recessed portion 105c, whereby the core body 101 is coupled to the retaining member 105.

In addition, a fitting portion 105b for attaching the conductive member 106 is formed in the retaining member 105 so as to project to an opposite side from the core body 101 side of the base portion 105a. The conductive member 106 is fitted into the fitting portion 105b.

The conductive member 106 is formed by an elastic member that is conductive and capable of elastic deformation. As shown in FIG. 19B, the conductive member 106 is formed in the form of a shell, for example, and has a curved surface portion 106a at one end in the axial direction of the conductive member 106. The diameter of the cylindrical portion 106b of the conductive member 106 is, for example, set somewhat larger than the inside diameter of the fitting portion 105b of the retaining member 105. The conductive member 106 is thereby fitted into the fitting portion 105b of the retaining member 105.

Because an elastic member is used as the conductive member 106, a contact area between the second surface portion 103b of the dielectric 103 and the curved surface portion 106a of the conductive member 106 is increased with an increase in pen pressure (pressure) applied to the core body 101.

The elastic member 107 is, for example, a conductive coil spring. The elastic member 107 has an elastic winding portion 107a, a terminal piece 107b at one end portion of the winding portion 107a, and a connecting portion 107c at another end portion of the winding portion 107a. As shown in FIG. 19B, the winding portion 107a of the elastic member 107 is disposed so as to cover the periphery of the conductive member 106 with the fitting portion 105b of the retaining member 105 interposed therebetween. The connecting portion 107c of the elastic member 107 comes into contact with the conductive member 106. The elastic member 107 is thereby electrically connected to the conductive member 106.

In addition, as shown in FIG. 19A, the terminal piece 107b of the elastic member 107 projects to one end in the axial direction of the holder 102 through a through hole (not shown) provided in the holder 102. The terminal piece 107b is connected to a contact portion (not shown) of the printed board. The terminal piece 107b of the elastic member 107 forms a second electrode of the variable capacitance capacitor.

Two engaging projecting portions 105d and 105e having a substantially triangular sectional shape are provided on two flat surface portions opposed to each other in side surface portions of the base portion 105a of the retaining member 105. The engaging projecting portions 105d and 105e are engaged with engaging holes 102d and 102e formed in the holder 102. In this engaged state, the elastic member 107 is retained between the flange portion 102a of the holder 102 and the base portion 105a, and the retaining member 105 is retained in the holder 102 in a state of being movable along the axial direction of the holder 102 by the length of the engaging holes 102d and 102e in the axial direction of the holder 102.

As shown in FIG. 19B, the curved surface portion 106a formed at one end in the axial direction of the conductive member 106 is disposed so as to be opposed to the second surface portion 103b of the dielectric 103, and the conductive member 106 forms the second electrode portion of the variable capacitance capacitor.

The variable capacitance capacitor acting as the pressure sensing portion of the pen pressure detecting mechanism part 100 formed as described above is shown in FIG. 19B in a state in which no pressure (pen pressure) is applied to the core body 101 (initial state). In the initial state, the conductive member 106 is physically separated from the second surface portion 103b of the dielectric 103, and is not in contact with the second surface portion 103b. When a pressure is applied to the core body 101, the thickness of an air layer between the conductive member 106 and the second surface portion 103b of the dielectric 103 becomes smaller than in the initial state.

Further, the pressure applied to the core body 101 may be increased, so that the curved surface portion 106a of the conductive member 106 comes into contact with the second surface portion 103b of the dielectric 103. The contact area between the second surface portion 103b of the dielectric 103 and the curved surface portion 106a of the conductive member 106 corresponds to the pressure applied to the core body 101.

The distance between the first electrode and the second electrode of the variable capacitance capacitor acting as the pressure sensing portion of the pen pressure detecting mechanism part 100 changes, as described above, according to the pressing force applied to the core body 101. Thus, the capacitance of a capacitor formed between the first electrode and the second electrode changes according to the pressing force applied to the core body 101.

As described above, the variable capacitance capacitor acting as the pressure sensing portion in the pen pressure detecting mechanism part of the variable capacitance capacitor type, which mechanism part has the constitution in related art has a large number of parts, such as the dielectric 103, the terminal member 104, the retaining member 105, the conductive member 106, the elastic member 107, and the like, and has a complex constitution. In addition, the first electrode of the variable capacitance capacitor needs to have a special structure in which an electric connection is secured by elastically crimping the first electrode to the surface of the dielectric 103. In addition, the second electrode of the variable capacitance capacitor needs to have a constitution in which the elastic member 107 is formed by a conductive coil spring, and the coil spring is electrically connected to the conductive member 106 that abuts against the dielectric and which changes an abutting area between the coil spring and the dielectric according to a pen pressure. This also results in a complex structure.

In addition, as described above, the pen pressure detecting mechanism part in related art has the constitution in which the plurality of mechanism parts as described above, which form the variable capacitance capacitor, are arranged in the axial direction of the core body of the position indicator within the hollow holder. There is thus a limit to the thinning of the pen pressure detecting mechanism part in related art. Electronic apparatuses including a position detecting device used in conjunction with a position indicator, for example, advanced portable telephone terminals referred to as smart phones, have been reduced in thickness. Thus, there has been a stronger desire to thin the position indicator. However, because there is a limit to the thinning of the constitution of the pen pressure detecting mechanism part in related art, it is difficult to further thin the position indicator.

In addition, the pen pressure detecting mechanism part in related art needs to be manufactured by inserting all of the plurality of parts of the pen pressure detecting mechanism part into the hollow portion of the cylindrical holder from both of one opening and another opening in the axial direction of the holder and arranging the parts within the hollow portion of the holder, and retaining the parts elastically in the axial direction.

Hence, the work of inserting all of the plurality of parts forming the pen pressure detecting mechanism part into the hollow portion of the holder and arranging the parts within the hollow portion of the holder while considering alignment of all of the plurality of parts in the axial direction and a direction orthogonal to the axial direction involves difficulty and increases the number of man-hours required for assembly. The pen pressure detecting mechanism part in related art is thus unsuitable for mass production.

BRIEF SUMMARY

In view of the above problems, it is desirable to provide a pen pressure detecting module that has a very simple constitution and which is suitable for thinning and is also suitable for mass production, and a position indicator using the pen pressure detecting module.

According to an embodiment of the present disclosure, there is provided a pen pressure detecting module including: a pressure sensing device having a first electrode, and a second electrode disposed so as to be opposed to the first electrode at a predetermined distance from the first electrode, a capacitance being formed between the first electrode and the second electrode, the pressure sensing device sensing a pressure applied to the second holder that is transmitted to the first electrode based on a change in the capacitance, the change in the capacitance being caused by a displacement of the first electrode in correspondence with the pressure; a first holder; and a second holder; the first holder having a hollow portion formed with a cylindrical inner shape, the second holder being housed in the hollow portion, and the pressure sensing device being disposed so as to sense a pressure applied to the second holder; the second holder having an engaging portion that engages a pressure transmitting member that transmits the pressure applied to the second holder.

A pressure sensing device of a variable capacitance type is used in the pen pressure detecting module according to an embodiment of the present disclosure, which pen pressure detecting module has the above-described constitution. That is, a pressure sensing device formed by a single part is used.

The pressure sensing device is disposed within the hollow portion of the first holder in a state of receiving the pressure by the first electrode. In this state, a pressing member applies the pressure applied to the core body of the position indicator to the pressure sensing device via the second holder. Hence, the pen pressure detecting module has a very simple constitution, and has a structure suitable for thinning and mass production.

According to an embodiment of the present disclosure, there is provided a position indicator having a shape of a pen and being capable of detecting a pressure applied to a tip portion of the position indicator, the position indicator including: a housing; a core body housed in the housing and having a first end projecting from the tip portion of the position indicator; and a pen pressure detecting module housed in the housing and detecting a pressure applied to the core body. The pen pressure detecting module including a pressure sensing device having a first electrode, and a second electrode disposed so as to be opposed to the first electrode at a predetermined distance from the first electrode, a capacitance being formed between the first electrode and the second electrode, the pressure sensing device sensing a pressure transmitted to the first electrode based on a change in the capacitance, the change in the capacitance being caused by a displacement of the first electrode in correspondence with the pressure, a first holder, and a second holder, the first holder having a hollow portion formed with a cylindrical inner shape, the second holder being housed in the hollow portion, and the pressure sensing device being disposed so as to sense a pressure applied to the second holder, the second holder having an engaging portion that engages a pressure transmitting member that transmits the pressure applied to the core body to the second holder.

According to an embodiment of the present disclosure, there is provided a pen pressure detecting module including: a pressure sensing device having a first electrode, and a second electrode disposed so as to be opposed to the first electrode at a predetermined distance from the first electrode, a capacitance being formed between the first electrode and the second electrode, the pressure sensing device sensing a pressure transmitted to the first electrode based on a change in the capacitance, the change in the capacitance being caused by a displacement of the first electrode in correspondence with the pressure; and a holder having a hollow portion having a cylindrical inner shape, and a pressure transmitting member that transmits the pressure applied to the holder, which is housed in the hollow portion, the pressure sensing device being disposed so as to sense the pressure transmitted to the pressure transmitting member; the holder having, in an inner circumferential surface of the hollow portion thereof, a locking portion that detachably locks the pressure transmitting member to the holder.

According to an embodiment of the present disclosure, there is provided a position indicator having a shape of a pen and being capable of detecting a pressure applied to a tip portion of the position indicator, the position indicator including: a housing; a locking portion formed in the housing; and a pen pressure detecting module locked by the locking portion to be housed in the housing. The pen pressure detecting module includes a pressure sensing device having a first electrode, and a second electrode disposed so as to be opposed to the first electrode at a predetermined distance from the first electrode, a capacitance being formed between the first electrode and the second electrode, the pressure sensing device sensing a pressure transmitted to the first electrode based on a change in the capacitance, the change in the capacitance being caused by a displacement of the first electrode in correspondence with the pressure, and a holder having a hollow portion having a cylindrical inner shape, and a pressure transmitting member that transmits a pressure applied to the holder housed in the hollow portion, the pressure sensing device being disposed so as to sense the pressure transmitted to the pressure transmitting member, the holder having, in an inner circumferential surface of the hollow portion thereof, a locking portion that detachably locks the pressure transmitting member to the holder; the pressure transmitting member housed in the hollow portion formed in the holder being exposed from the tip portion of the position indicator; the pressure applied to the pressure transmitting member exposed from the tip portion being transmitted to the pressure sensing device.

According to the present disclosure, it is possible to provide a pen pressure detecting module that has a very simple constitution and which is suitable for thinning and is also suitable for mass production.

BRIEF DESCRIPTION OF THE SEVERAL
VIEWS OF THE DRAWINGS

Figure 1A:
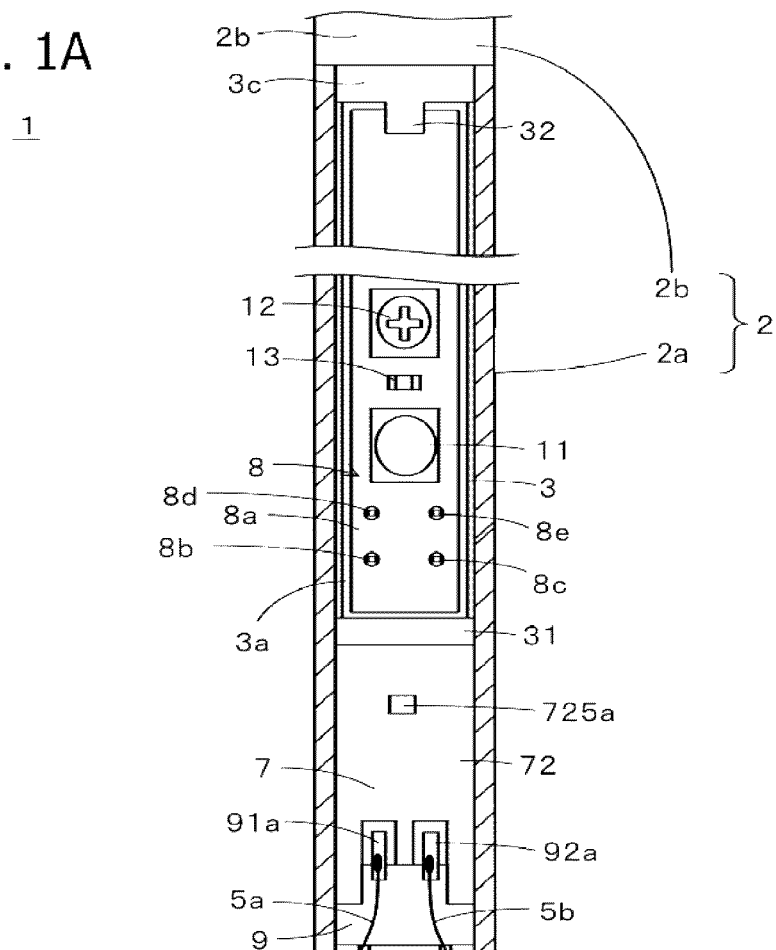
Figure 1B:
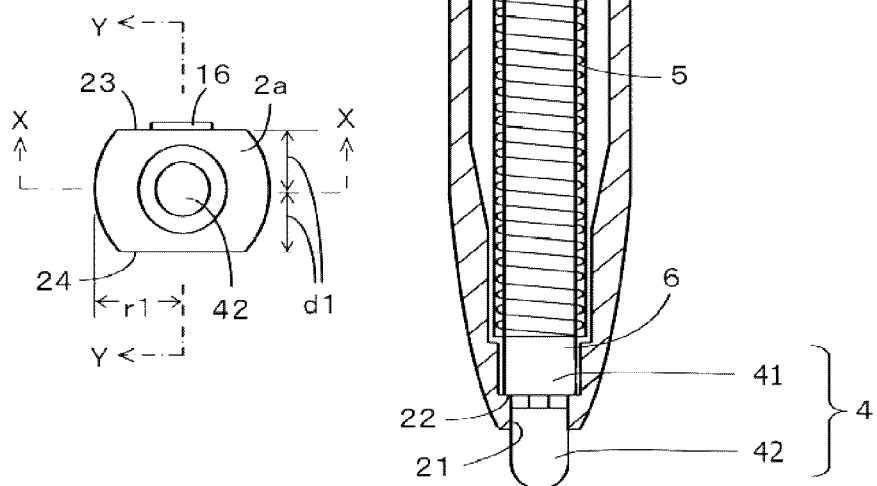
Figure 2:
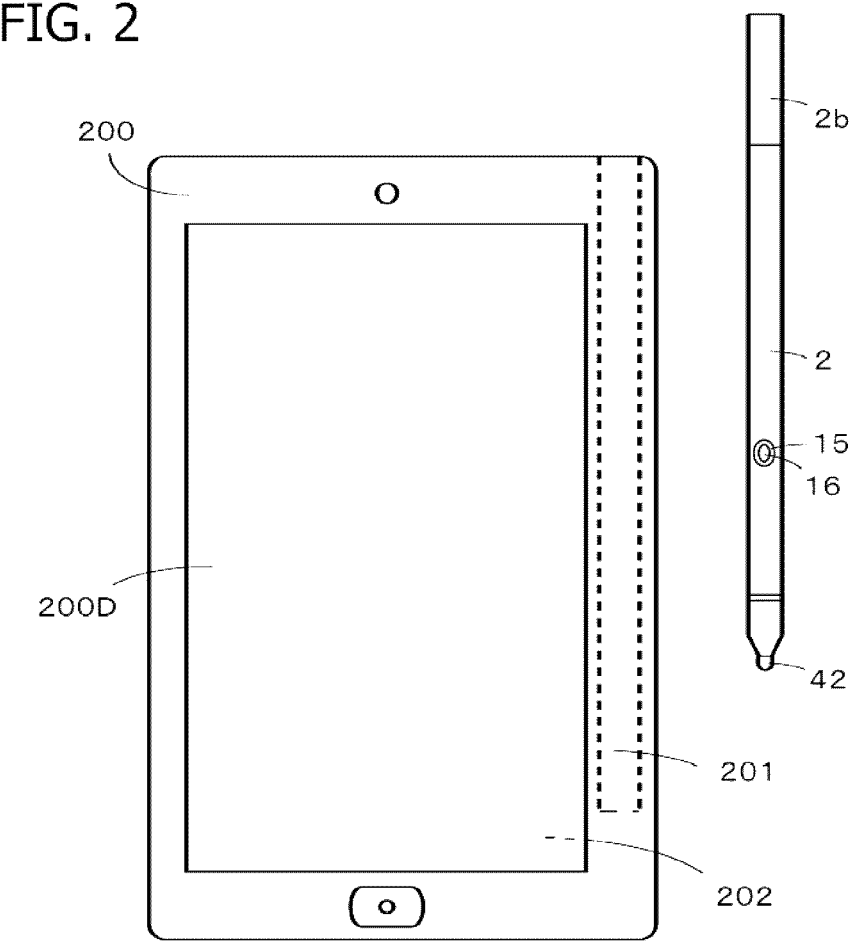
Figure 3A:
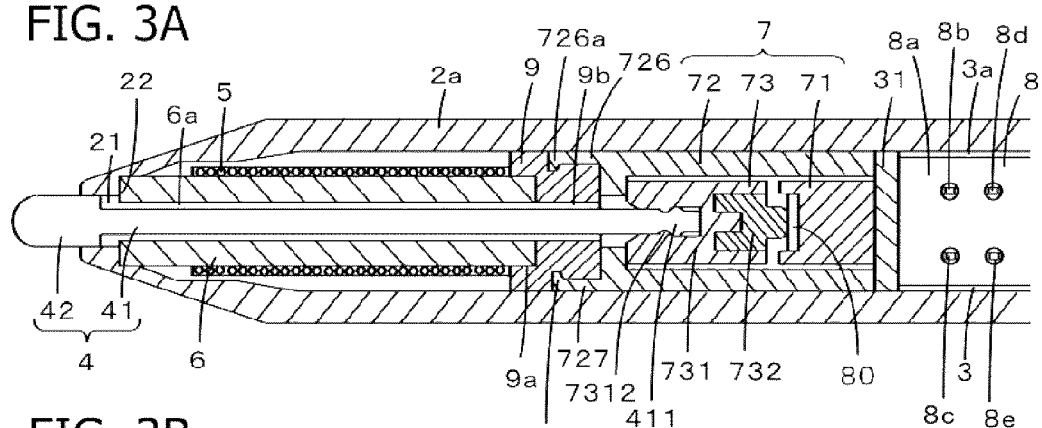
Figure 3B:
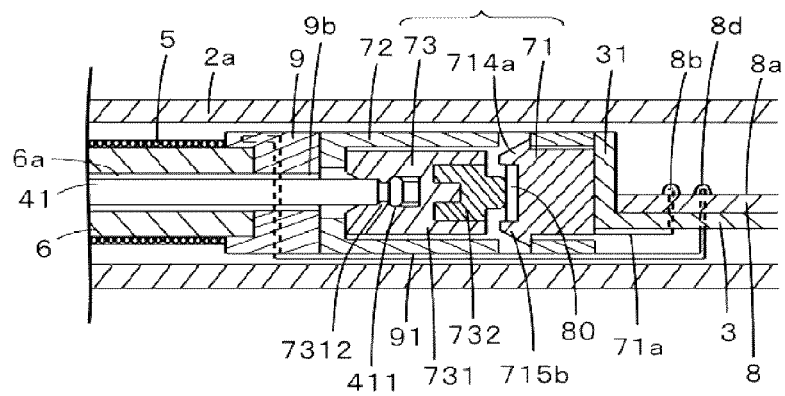
Figure 4:
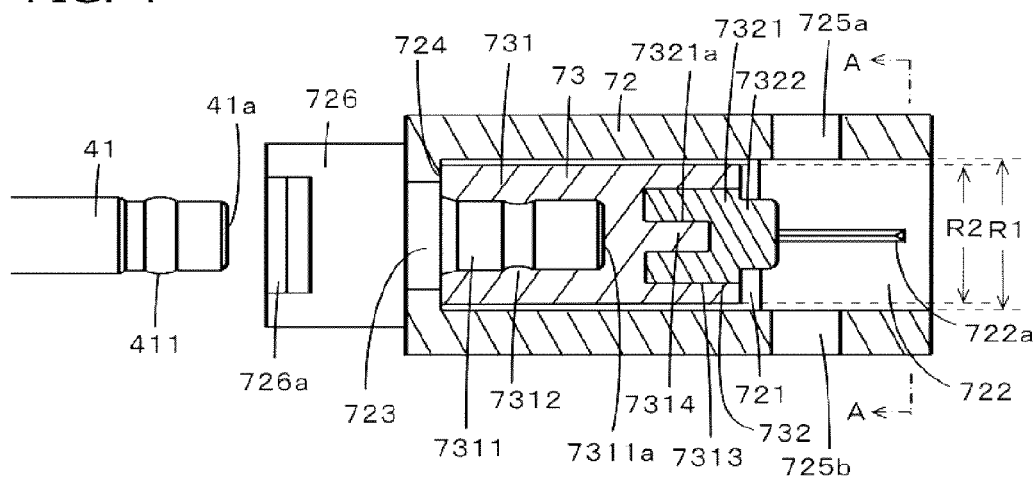
Figure 5:
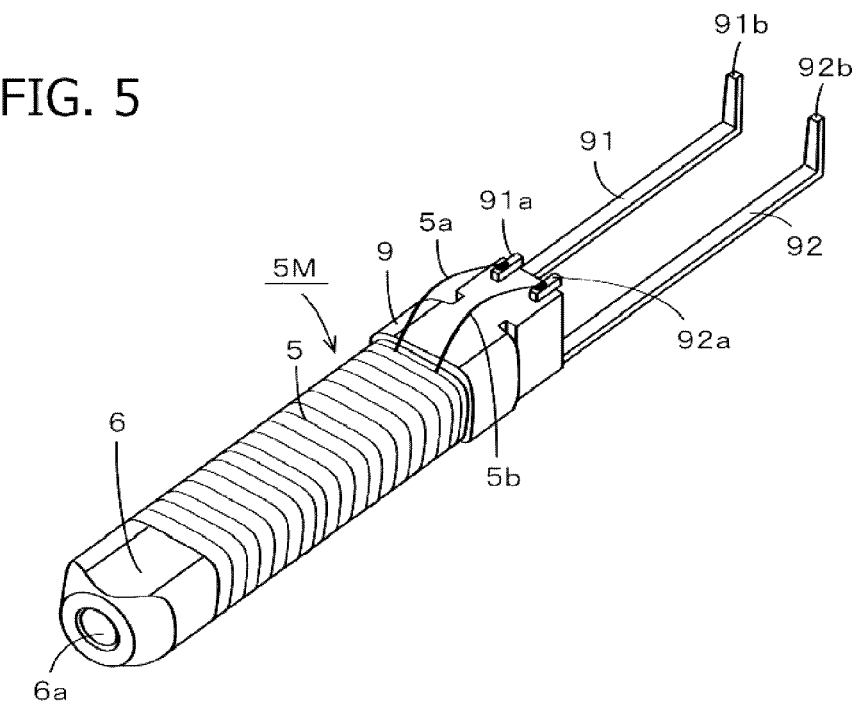
Figure 6:
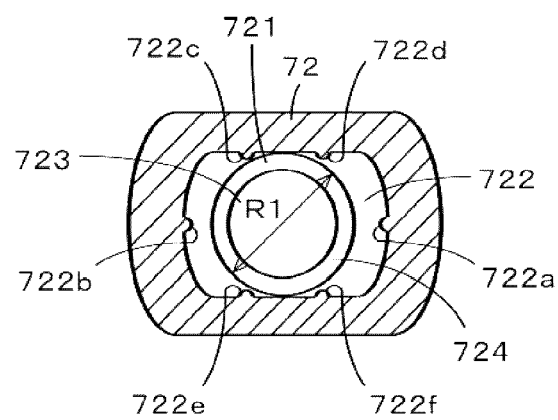
Figure 7A:
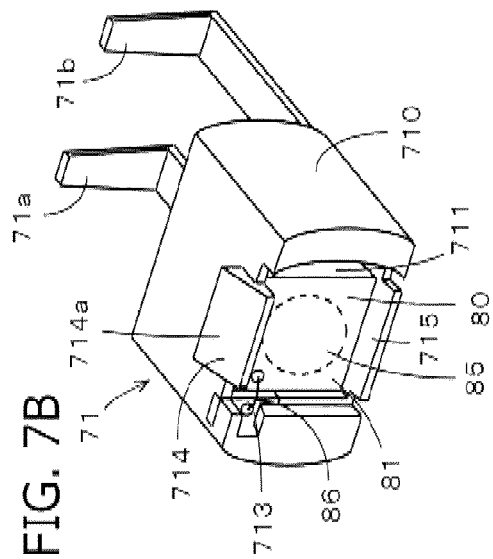
Figure 7B:
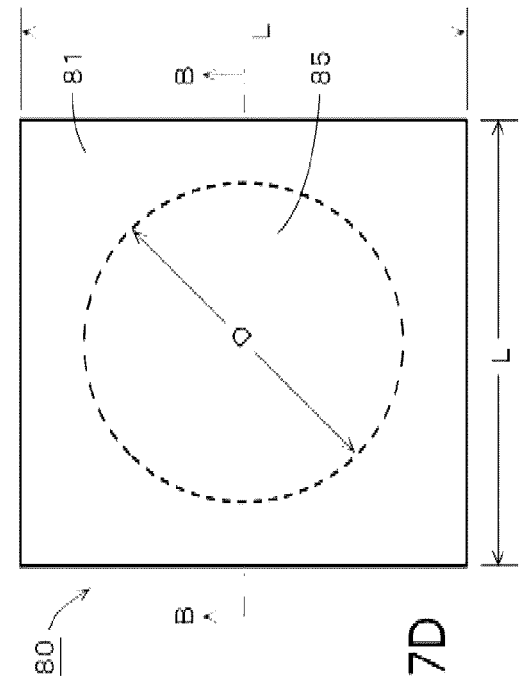
Figure 7C:
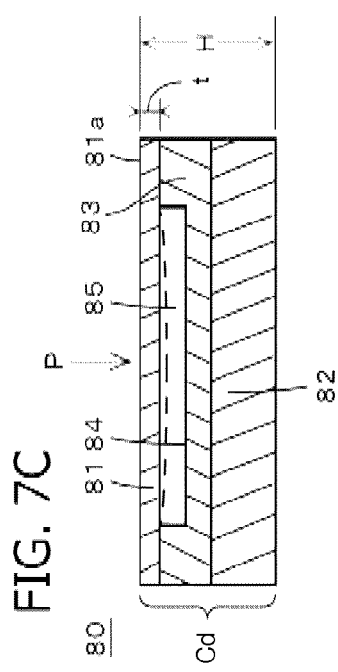
Figure 7D:
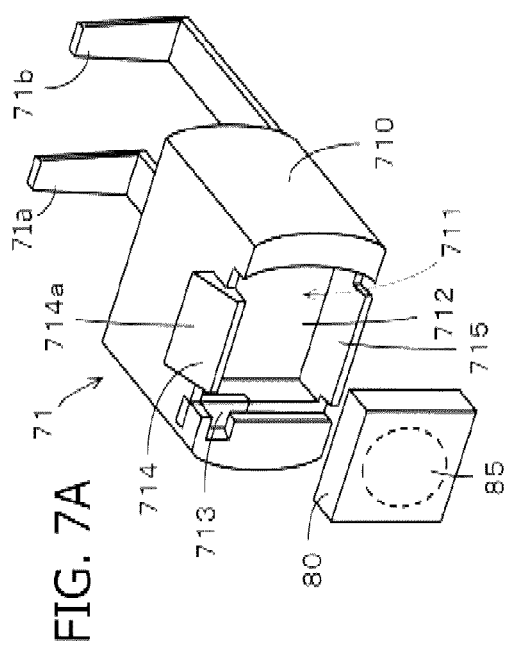
Figure 8:
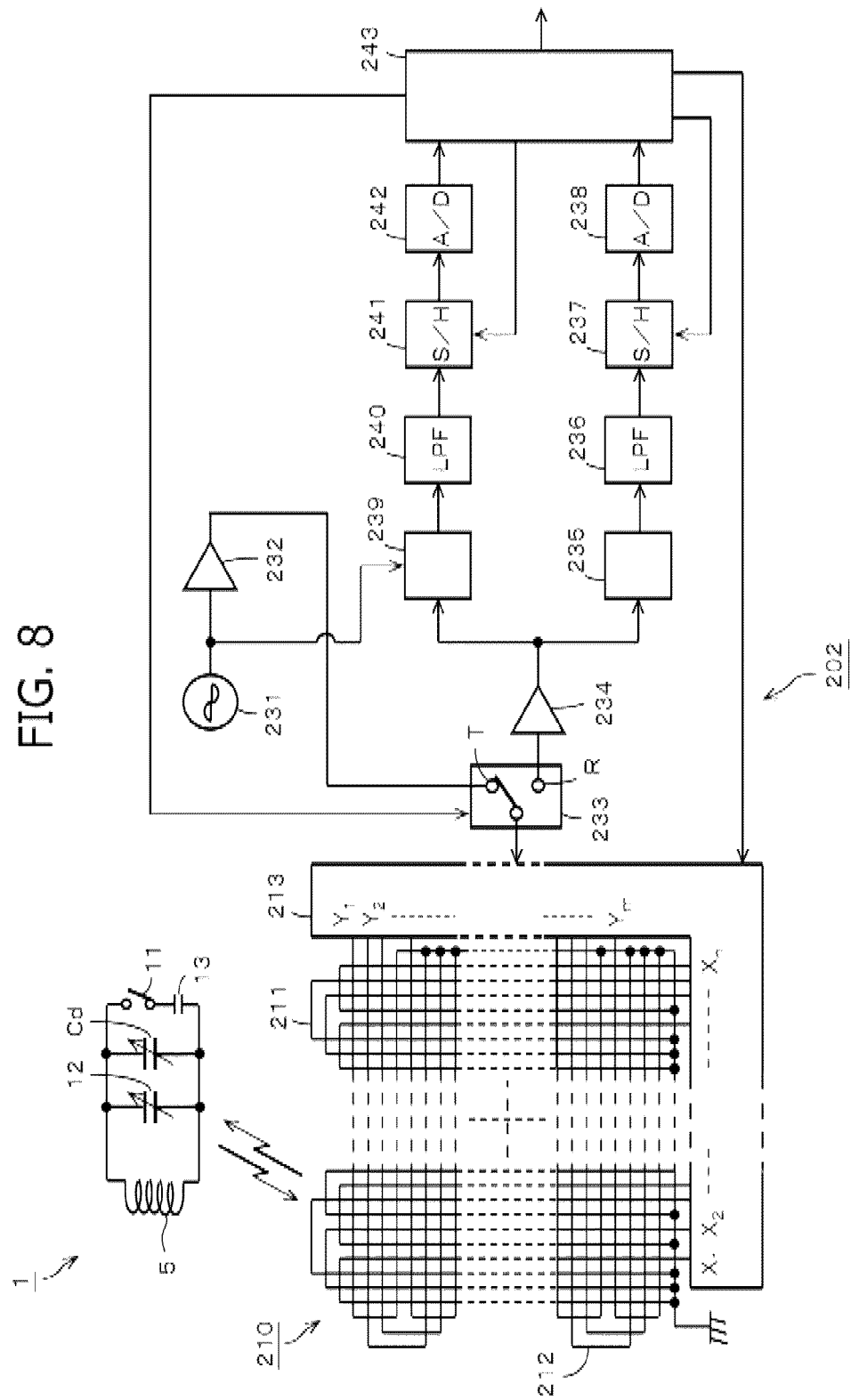
Figure 9A:
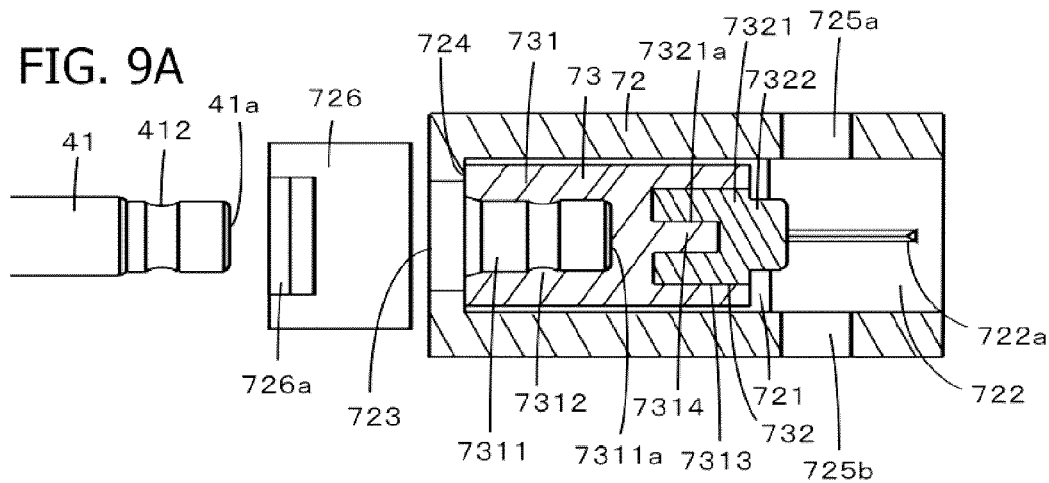
Figure 9B:
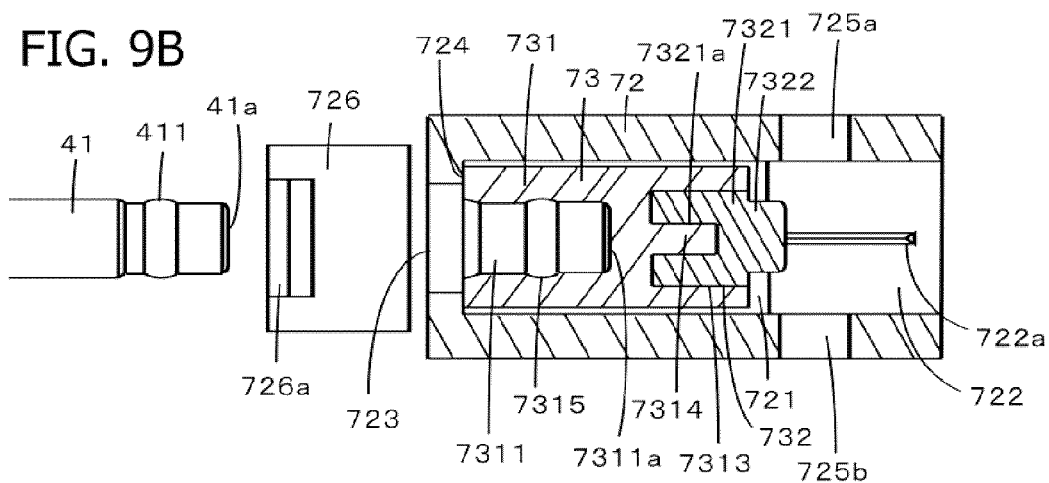
Figure 10A:
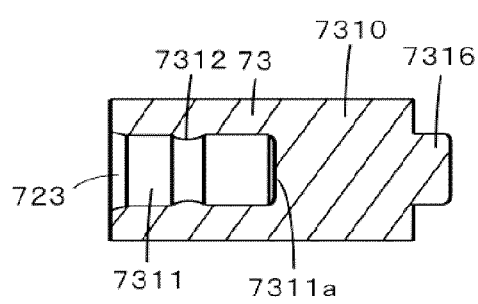
Figure 10B:
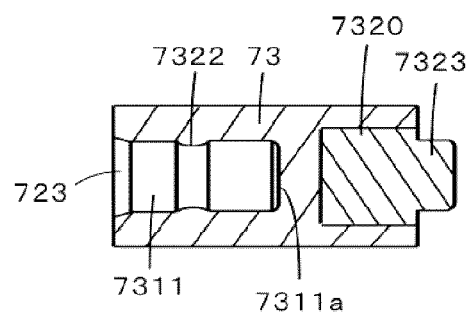
Figure 13:
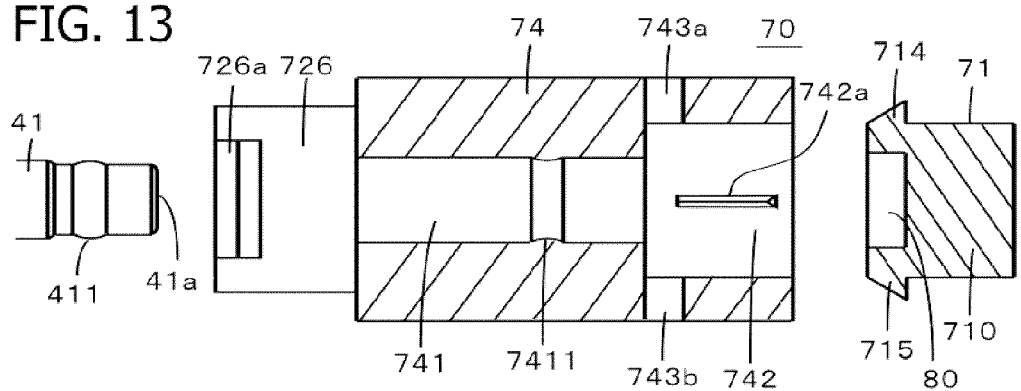
Figure 14A:
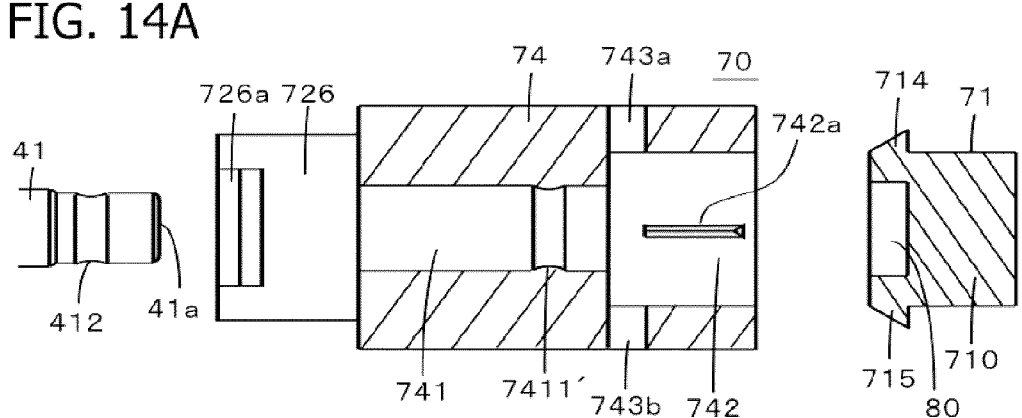
Figure 14B:
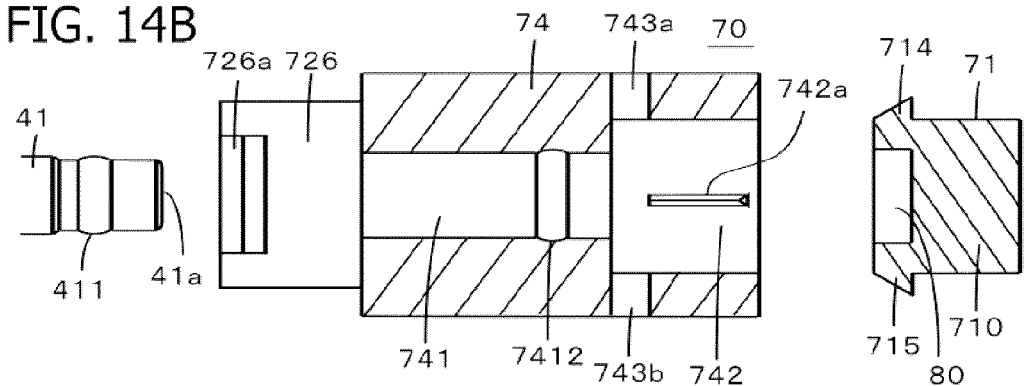
Figure 15A:
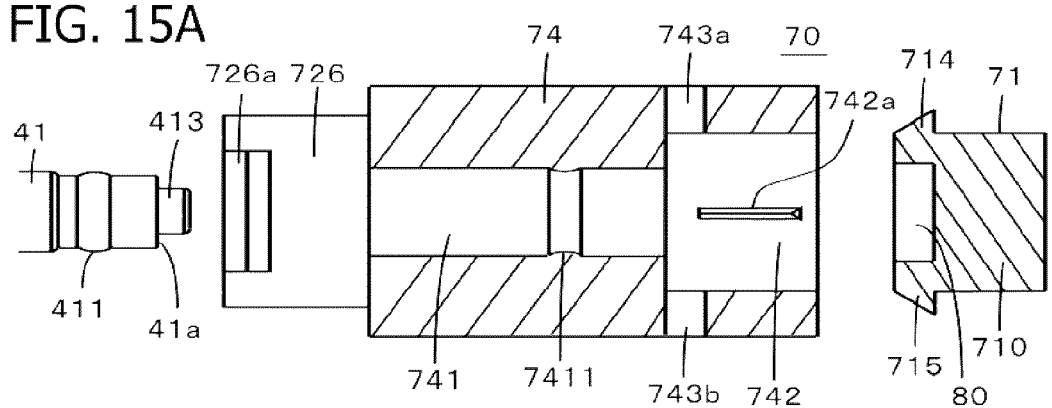
Figure 15B:
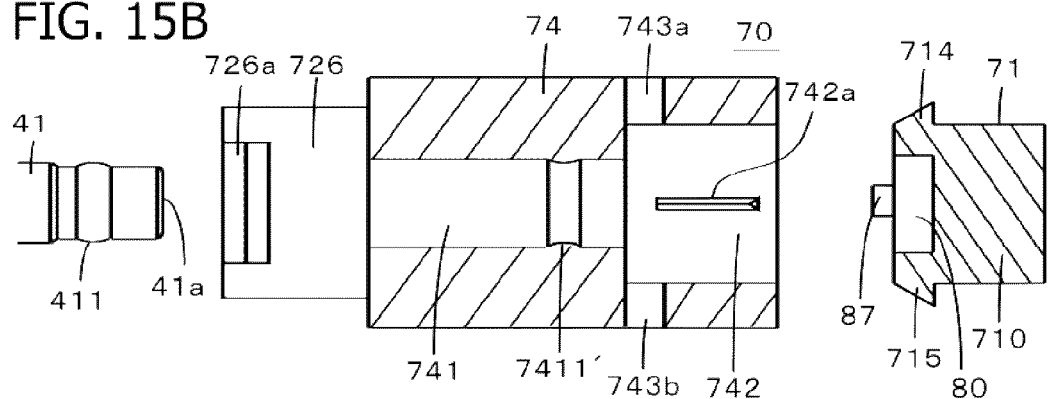
Figure 16:
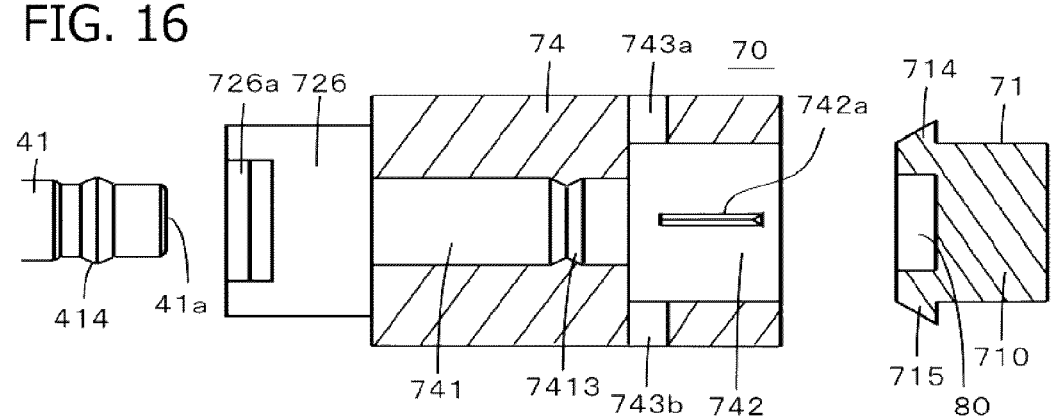
Figure 17:
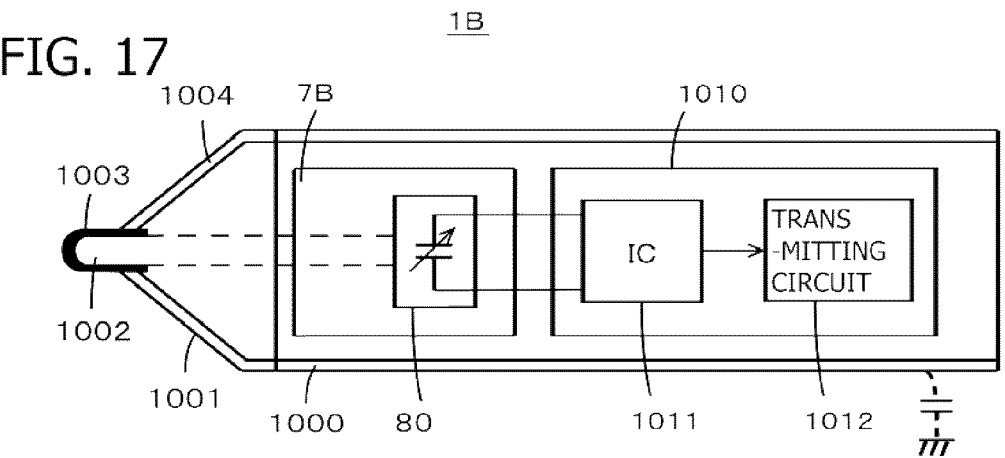
Figure 18:
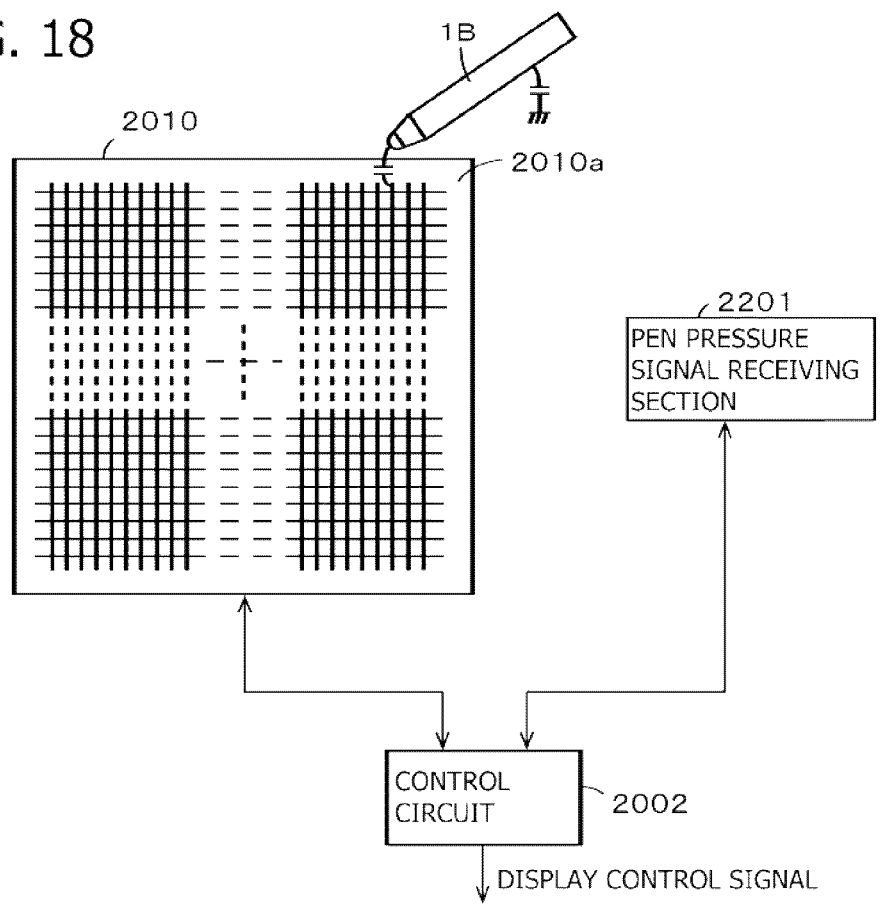

FIG. 1A is a cross-sectional view of a position indicator including a pen pressure detecting module, according to an embodiment of the present disclosure;

FIG. 1B is bottom view of the position indicator shown in FIG. 1A;

FIG. 2 is a top view of a position indicator and an electronic apparatus provided with a position detecting device used in conjunction with the position indicator, according to an embodiment of the present disclosure;

FIGS. 3A and 3B are cross-sectional views of portions of a position indicator, according to an embodiment of the present disclosure;

FIG. 4 is a cross-sectional view of a position indicator, according to an embodiment of the present disclosure;

FIG. 5 is a perspective view of a coil wound around a ferrite core and led-out lead electrodes thereof, which are used in a position indicator, according to an embodiment of the present disclosure;

FIG. 6 is a cross-sectional view of a holder used with a pen pressure detecting module, according to an embodiment of the present disclosure;

FIGS. 7A and 7B are perspective views of a pressure sensing device and a semiconductor chip used in a pen pressure detecting module, according to an embodiment of the present disclosure;

FIG. 7C is a cross-sectional view of the semiconductor chip shown in FIGS. 7A and 7B;

FIG. 7D is a side view of the semiconductor chip shown in FIGS. 7A and 7B;

FIG. 8 is a circuit diagram of a position indicator and a position detecting device, according to an embodiment of the present disclosure;

FIGS. 9A and 9B are cross-sectional views of a pen pressure detecting module, according to an embodiment of the present disclosure;

FIGS. 10A and 10B are cross-sectional views of a pen pressure detecting module, according to an embodiment of the present disclosure;

FIGS. 11A and 11B are cross-sectional views of a pen pressure detecting module, according to an embodiment of the present disclosure;

FIG. 12 is a side view of a pressure transmitting member engaged with a pen pressure detecting module, according to an embodiment of the present disclosure;

FIG. 13 is a cross-sectional view of a pen pressure detecting module, according to an embodiment of the present disclosure;

FIGS. 14A and 14B are cross-sectional views of a pen pressure detecting module, according to an embodiment of the present disclosure;

FIGS. 15A and 15B are cross-sectional views of a pen pressure detecting module, according to an embodiment the present disclosure;

FIG. 16 is a cross-sectional view of a pen pressure detecting module, according to an embodiment the present disclosure;

FIG. 17 is a schematic diagram of a position indicator including a pen pressure detecting module, according to an embodiment the present disclosure;

FIG. 18 is a schematic diagram of a position detecting device and the position indicator shown in FIG. 17, according to an embodiment of the present disclosure;

FIG. 19A is a perspective view of a prior-art capacitance type of pen pressure detecting module; and FIG. 19B is a cross-sectional view of the pen pressure detecting module shown in FIG. 19A.

DETAILED DESCRIPTION

A few embodiments of a pen pressure detecting module and a position indicator according to the present disclosure will hereinafter be described with reference to the drawings.

First Embodiment

FIGS. 1A to 7D are diagrams of assistance in explaining an example constitution of a position indicator 1 according to a first embodiment of the present disclosure. FIG. 2 shows an example of an electronic apparatus 200 that operates in conjunction with the position indicator 1, according to the first embodiment. In the present example, the electronic apparatus 200 is an advanced portable telephone terminal having a display screen 200D of a display device such as, for example, a Liquid Crystal Display (LCD). The electronic apparatus 200 also includes a position detecting device 202 of an electromagnetic induction type, under (on the back side of) the display screen 200D.

The electronic apparatus 200 in the present example includes a housing having a recessed portion 201 in which the position indicator 1, which is in the shape of a pen, may be stored. As required, a user removes the position indicator 1 from the recessed portion 201 of the housing of the electronic apparatus 200, and performs a position indicating operation with the display screen 200D as an input surface.

In the electronic apparatus 200, when the position indicating operation is performed on the display screen 200D by the pen-shaped position indicator 1, the position detecting device 202 provided on the back side of the display screen 200D detects a position indicated by the position indicator 1 and a pen pressure. A microcomputer included in the position detecting device 202 of the electronic apparatus 200 performs display processing according to the indicated position on the display screen 200D and the pen pressure.

FIGS. 1A and 1B show portions of the position indicator 1 according to the first embodiment. FIG. 1A is a cross-sectional view showing the inside of a case main body 2a of a case 2 (casing) of the position indicator 1 with a portion of the case main body 2a cut away for illustrative purposes. FIG. 1B is a view of the position indicator 1 according to the first embodiment as viewed in an axial direction from the side of a core body 4.

FIG. 3A is a cross-sectional view taken along a line X-X of FIG. 1B. FIG. 3A is a fragmentary sectional view taken by cutting the position indicator 1 in a direction that passes through the axial position of the position indicator 1 and which is parallel to two straight lines 23 and 24 (see FIG. 1B) of the external shape of the case main body 2a. FIG. 3B is a cross-sectional view taken along a line Y-Y of FIG. 1B. FIG. 3B is a fragmentary sectional view taken by cutting the position indicator 1 in a direction that passes through the axial position of the position indicator 1 and which is perpendicular to the above-described two straight lines 23 and 24 (see FIG. 1B) of the external shape of the case main body 2a. FIG. 4 is an enlarged view of the pen pressure detecting module in the present embodiment.

As shown in FIG. 1A, the case 2 of the position indicator 1 forms a bottomed cylindrical casing elongated in the axial direction, opened on one end in the axial direction, and closed on another end in the axial direction. This case 2 is formed of a resin, for example. The main body 2a of the case 2 has a cylindrical shape having a hollow portion therewithin and a case cap 2b coupled to the case main body 2a.

In the present embodiment, an external shape of the case main body 2a in a direction orthogonal to a central axis of the case main body 2a (which external shape is equal to the contour shape of a cross section of the case main body 2a) is a flat shape as shown in FIG. 1B. The external shape in the example shown in FIG. 1B is equal to a shape obtained by cutting and removing side surfaces of a circular cylinder having a circular cross section of a radius r1 by planes parallel to each other, which planes are at positions distant from the central axis of the circular cylinder by a distance dl shorter than the radius r1. Hence, as shown in FIG. 1B, the external shape of the case main body 2a in the direction orthogonal to the central axis of the case main body 2a has two straight lines 23 and 24 parallel to each other (corresponding to the positions of the planes parallel to each other) which straight lines 23 and 24 are opposed to each other with the central axis interposed therebetween. The hollow portion inside the case main body 2a also has a flat cross-sectional shape corresponding to the external shape of the case main body 2a.

A core body 4 and a magnetic core wound with a coil 5, which magnetic core is a ferrite core 6 in the present example, are coupled with each other and housed in a board holder 3 within the hollow portion of the case main body 2a. The core body 4 includes a core body main body portion 41 formed by a thin rod-shaped body and a tip portion 42 formed on one end in the axial direction of the core body main body portion 41. The tip portion 42 of the core body 4 is projected and exposed to the outside through an opening 21 formed at one end portion in the axial direction of the case main body 2a, which end portion forms a pen point of the case main body 2a. The outside diameter of the tip portion 42 of the core body 4 is, for example, 1 mm to 2 mm.

The core body main body portion 41 is a cylindrical rod-shaped body having a smaller diameter than the diameter of the tip portion 42.

In this case, the hollow portion of the case main body 2a has a diameter larger than the diameter of the opening 21, and a step portion 22 is formed on an inner wall surface forming the hollow portion on the side of the opening 21.

In the present example, the core body 4 is formed of a resin as an example of a hard material, for example, polycarbonate, synthetic resin, ABS (acrylonitrile-butadiene-styrene) resin, or the like so that the core body 4 can transmit a pressure (pen pressure) applied to the tip portion 42 to the pen pressure detecting module 7 in a state of the core body 4 being inserted in a through hole 6a (see FIGS. 3A and 3B) of the ferrite core 6 and engaged with the pen pressure detecting module 7.

The ferrite core 6 in the present example has a columnar shape that is provided with the through hole 6a of a diameter slightly larger than the diameter of the core body main body portion 41 at the position of the central axis for insertion of the core body main body portion 41 of the core body 4. The ferrite core 6 in the present embodiment is formed so as to have a flat cross-sectional shape corresponding to the cross-sectional shape of the hollow portion of the case main body 2a.

The board holder 3 is formed of a resin, for example. The board holder 3 includes a printed board mounting base portion 3a in a longitudinal direction that is the axial direction of the position indicator 1 when the board holder 3 is housed within the hollow portion of the case main body 2a. A printed board 8 is mounted on the printed board mounting base portion 3a of the board holder 3. The printed board 8 is of an elongate rectangular shape having a width smaller than the inside diameter of the case main body 2a and having a predetermined length in the longitudinal direction. The length in the longitudinal direction of a board mounting flat surface of the printed board mounting base portion 3a is substantially equal to or slightly larger than the length in the longitudinal direction of the printed board 8. In addition, the length in a width direction of the board mounting flat surface of the printed board mounting base portion 3a is selected to be slightly larger than the width of the printed board 8.

The printed board 8 is provided with a push switch (side switch) 11 that is turned on when depressed and which returns to an off state when the depression is stopped, and is provided with capacitors 12 and 13 forming a resonance circuit together with an inductance element formed by the coil 5 wound around the ferrite core 6. The capacitor 12 in the present example is a trimmer capacitor whose capacitance can be adjusted. Further, other circuit parts and conductor patterns not shown in the figures are formed on the printed board 8. Incidentally, a capacitance Cd formed by a semiconductor chip 80 of the pen pressure detecting module 7 to be described later is also connected to the resonance circuit so as to be in parallel with the inductance element.

In the present example, a through hole 15 (see FIG. 2) is made at a position corresponding to the side switch 11 in the side circumferential surface of the case main body 2a of the position indicator 1. A depression operating element 16 of the side switch 11 is exposed such that the side switch 11 can be depressed through the through hole 15. In this case, the electronic apparatus 200 including the position detecting device 202 to be described later assigns and sets a predetermined function to an operation of depressing the side switch 11 by the depression operating element 16. For example, the electronic apparatus 200 in the present example can assign and set the operation of depressing the side switch 11 by the depression operating element 16 as an operation similar to a clicking operation on a pointing device such as a mouse or the like.

The capacitors 12 and 13 forming a part of the resonance circuit in the present example are disposed as chip parts on the printed board 8. In the present embodiment, the resonance frequency of the resonance circuit is adjusted by adjusting the capacitance of the trimmer capacitor 12.

In the present example, a wall portion 31 disposed in a direction orthogonal to the printed board mounting base portion 3a is formed at an end portion in the longitudinal direction of the printed board mounting base portion 3a of the board holder 3, which end portion is on the side of the core body 4. A part of the wall portion 31 forms one end portion in the longitudinal direction of the board holder 3. A surface of the wall portion 31, which surface is on the side of the core body 4, is a flat surface.

In addition, formed at an end portion in the longitudinal direction of the printed board mounting base portion 3a of the board holder 3, which end portion is on an opposite side from the side of the core body 4, is a locking portion 32 for locking an end portion in the longitudinal direction of the printed board 8 to the printed board mounting base portion 3a by sandwiching the printed board 8 in a thickness direction at the end portion in the longitudinal direction of the printed board 8.

The pen pressure detecting module 7 is provided between the wall portion 31 of the board holder 3 and the ferrite core 6 wound with the coil 5 in the axial direction of the hollow portion of the case main body 2a. In this case, as will be described later, an end surface of the pen pressure detecting module 7, which end surface is on the opposite side from the side of the core body 4, is a flat surface and abuts against a surface of the wall portion 31 of the board holder 3.

The pen pressure detecting module 7 is fixed to the board holder 3 by soldering metallic terminal pieces 71a and 71b (see FIG. 3B) led out in the axial direction from a pressure sensing device 71 retained in the pen pressure detecting module 7 at soldering portions 8b and 8c in the vicinity of the wall portion 31 of the printed board mounting base portion 3a of the board holder 3, which wall portion 31 is on the side of the core body 4 in the longitudinal direction.

In this case, as shown in FIG. 3B, the metallic terminal pieces 71a and 71b are led out from the pressure sensing device 71 in the axial direction of the hollow portion of the case main body 2a. Ends of the metallic terminal pieces 71a and 71b are bent to the printed board 8 in a direction orthogonal to the above axial direction. Through holes are formed in the printed board 8 at positions of the soldering portions 8b and 8c, and through holes are formed at corresponding positions in the printed board mounting base portion 3a of the board holder 3. The bent parts of the end portions of the metallic terminal pieces 71a and 71b are inserted from the back side of the printed board mounting base portion 3a through the through holes of the printed board mounting base portion 3a and the through holes of the printed board 8, and are projected to the side of a board surface 8a of the printed board 8. The soldering portions 8b and 8c are formed by soldering the end portions of the metallic terminal pieces 71a and 71b, which end portions are projected to the side of the board surface 8a of the printed board 8.

The soldering portions 8b and 8c establish electric connection between circuit parts on the printed board 8 and a pressure sensing portion of the pressure sensing device 71, and the pen pressure detecting module 7 is fixed to the board holder 3 by performing soldering at the soldering portions 8*b* and 8*c* in a state in which the pen pressure detecting module 7 retaining the pressure sensing device 71 abuts against the wall portion 31 of the board holder 3.

In addition, in the present embodiment, as shown in FIG. 1A and FIGS. 3A and 3B, the opposite side of the ferrite core 6 from the side of the tip portion 42 of the core body 4 is coupled to a terminal leading member 9 formed of a resin, for example. FIG. 5 shows a constitution of a coil module 5M formed by the ferrite core 6 wound with the coil 5 and the terminal leading member 9. As shown in FIG. 1A and FIGS. 3A and 3B, the ferrite core 6 is coupled to the terminal leading member 9 by fitting an end portion of the ferrite core 6, which end portion is on the opposite side from the side of the tip portion 42 of the core body 4, into a recessed portion 9*a* provided in the terminal leading member 9 formed of a resin, for example, and bonding the end portion of the ferrite core 6 to the recessed portion 9*a* by an adhesive.

As shown in FIGS. 3A and 3B, the terminal leading member 9 has a through hole 9*b* formed in the axial direction, which through hole 9*b* has the same inside diameter as the through hole 6*a* of the ferrite core 6, and communicates with the through hole 6*a* when the terminal leading member 9 is coupled to the ferrite core 6. As shown in FIGS. 3A and 3B, the core body main body portion 41 of the core body 4 is inserted through the through hole 6*a* of the ferrite core 6 and the through hole 9*b* of the terminal leading member 9, and inserted as a pressure transmitting member into the pen pressure detecting module 7. The pen pressure detecting module 7 receives a pressure (pen pressure) applied to the tip portion 42 of the core body 4 via the core body main body portion 41 as the pressure transmitting member, and detects the pressure (pen pressure) applied to the tip portion 42 of the core body 4 as a capacitance, as will be described later.

As shown in FIG. 3B and FIG. 5, a pair of metallic terminal pieces 91 and 92 extending in the axial direction of the ferrite core 6 is led out from a part of the terminal leading member 9, which part is a bottom portion as viewed from the side of the board surface 8*a* of the printed board 8. End portions of the metallic terminal pieces 91 and 92 are fixed to the inside of the terminal leading member 9 by a resin mold, and ends 91*a* and 92*a* of the end portions of the metallic terminal pieces 91 and 92 are projected and exposed to the outside of the terminal leading member 9, as shown in FIG. 1A and FIG. 5. One terminal 5*a* of the coil 5 wound around the ferrite core 6 is, for example, soldered and connected to the end 91*a* of the end portion of the metallic terminal piece 91, and another terminal 5*b* of the coil 5 is, for example, soldered and connected to the end 92*a* of the end portion of the metallic terminal piece 92. Hence, the metallic terminal pieces 91 and 92 form lead terminals connected to the one terminal 5*a* and the other terminal 5*b* of the coil 5.

As shown in FIG. 3B and FIG. 5, other end portions of the metallic terminal pieces 91 and 92 are bent portions 91*b* and 92*b*, which are bent to the side of the printed board 8 in the direction orthogonal to the axial direction. Through holes are formed in the printed board 8 at positions of soldering portions 8*d* and 8*e* corresponding to the bent portions 91*b* and 92*b* of the other end portions of the metallic terminal pieces 91 and 92, and through holes are formed at corresponding positions in the printed board mounting base portion 3*a* of the board holder 3.

The bent portions 91*b* and 92*b* of the other end portions of the metallic terminal pieces 91 and 92 are inserted from the back side of the printed board mounting base portion 3*a* through the through holes of the printed board mounting base portion 3*a* and the through holes of the printed board 8, and are projected to the side of the board surface 8*a* of the printed board 8. The soldering portions 8*d* and 8*e* as shown in FIG. 1A and FIG. 3A are formed by soldering the bent portions 91*b* and 92*b* of the other ends of the metallic terminal pieces 91 and 92, which bent portions are projected to the side of the board surface 8*a* of the printed board 8.

The soldering portions 8*d* and 8*e* establish electric connections between circuit parts on the printed board 8 and the one terminal 5*a* and the other terminal 5*b* of the coil 5, and the ferrite core 6 coupled to the terminal leading member 9 and wound with the coil 5 is fixed to the board holder 3 by performing soldering at the soldering portions 8*d* and 8*e*.

Incidentally, the coil module 5M formed by coupling the ferrite core 6 wound with the coil 5 and the terminal leading member 9 to each other is coupled to the pen pressure detecting module 7 in the axial direction, as will be described later. Hence, in the state in which the coil module 5M and the pen pressure detecting module 7 are coupled to each other, the ferrite core 6 wound with the coil 5 and the pen pressure detecting module 7 are connected and fixed to the printed board 8 by fixing the metallic terminal pieces 71*a* and 71*b* led out from the pressure sensing device 71 to the printed board 8 by soldering at the soldering portions 8*b* and 8*c* and fixing the metallic terminal pieces 91 and 92 led out from the terminal leading member 9 to the printed board 8 by soldering at the soldering portions 8*d* and 8*e*.

Incidentally, as shown in FIG. 1A, the printed board 8 in a state of being locked to the printed board mounting base portion 3*a* by the locking portion 32 and fixed to the printed board mounting base portion 3*a* by the soldering portions 8*b*, 8*c*, 8*d*, and 8*e* is not in contact with the inner wall surface of the case main body 2*a* but is separated from the case main body 2*a*.

In addition, as shown in FIG. 1A, in the present example, the board holder 3 is coupled to the case cap 2*b* at a coupling portion 3*c* of an end portion in the longitudinal direction of the printed board mounting base portion 3*a*, which end portion is on the opposite side from the side of the core body 4, so that the case cap 2*b* and the board holder 3 can be handled as an integral unit.

Hence, in the present example, a part formed by mounting and fixing the printed board 8 on the printed board mounting base portion 3*a* of the board holder 3 and fixing and retaining, by the board holder 3, the coil module formed by coupling the pen pressure detecting module 7 and the ferrite core 6 wound with the coil 5 to the terminal leading member 9 can be handled as one module part (referred to as a pen module part). The pen module part is housed within the hollow portion of the case main body 2*a*, and the core body 4 is inserted from the opening 21 of the case main body 2*a* and engaged with the pen pressure detecting module 7 through the through hole 6*a* of the ferrite core 6 and the through hole 9*b* of the terminal leading member 9, whereby the position indicator 1 is completed.

In this case, the case cap 2*b* is coupled to the case main body 2*a*. The board holder 3 is thereby locked so as not to move in the axial direction in the hollow portion of the case main body 2*a*. The pen pressure detecting module 7 is fixed to the board holder 3. The pen pressure detecting module 7 is thereby also locked so as not to move in the axial direction in the hollow portion of the case main body 2*a*, and is thus able to receive a pen pressure applied to the core body 4.

Incidentally, when the pen pressure detecting module 7 and the coil module 5M are coupled to the board holder 3, the position of a center line in the axial direction of the pen pressure detecting module coincides with the position of a center line in the axial direction of the coil module 5M. In addition, in the state in which the pen module part is housed within the hollow portion of the case main body 2a, the board holder 3 is coupled to the case cap 2b such that the position of the center line in the axial direction of the pen pressure detecting module and the position of the center line in the axial direction of the coil module 5M coincide with the position of a center line in the axial direction of the hollow portion of the case main body 2a.

Example of Constitution of Pen Pressure Detecting Module

The constitution of the pen pressure detecting module 7 in the present embodiment will next be described with reference to FIGS. 3A and 3B, FIG. 4, and FIG. 6. The pen pressure detecting module 7 includes the pressure sensing device 71, an outside holder 72 as a first holder, and an inside holder 73 as a second holder. The outside holder 72 is formed of a hard resin, for example, a POM (polyoxymethylene; polyacetal) resin or polycarbonate.

The outside holder 72 (see FIG. 6) has a cylindrical shape, and includes a first housing space 721 for the inside holder 73 and a second housing space 722 for the pressure sensing device 71 in a cylindrical hollow portion of the outside holder 72.

FIG. 4 is a sectional view of a state in which the inside holder 73 is housed in the first housing space 721 of the outside holder 72. FIG. 6 is a sectional view when the outside holder 72 is cut along a line A-A of FIG. 4. FIG. 6 shows a state of a section of the outside holder 72 not housing the inside holder 73.

As shown in FIG. 6, the outside holder 72 has a constitution of a cylindrical body having a flat shape similar to that of the terminal leading member 9. The first housing space 721 is a cylindrical space having a predetermined diameter R1. The second housing space 722 is a recessed portion space having a flat shape in accordance with the external shape of the pressure sensing device 71 to be described later. The position of a center line in the axial direction of the first housing space 721 coincides with the position of a center line in the axial direction of the second housing space 722, and in the present example, the length in a short-side direction of a section of the second housing space 722 substantially coincides with the diameter R1 of the first housing space 721.

On the side of the second housing space 722 of the outside holder 72, an opening is formed over an entire portion of the housing space 722. On the other hand, an opening 723 whose diameter is smaller than the diameter R2 of the inside holder 73 to be described later and is larger than the diameter of the core body main body portion 41 is formed on a side of the first housing space 721 of the outside holder 72 into which side the core body main body portion 41 of the core body 4 is inserted. Hence, a stepped portion 724 is formed on the side of the first housing space 721 of the outside holder 72 into which side the core body main body portion 41 of the core body 4 is inserted. As shown in FIG. 4, the stepped portion 724 prevents the inside holder 73 housed within the first housing space 721 from falling off the outside holder 72 to the side of the core body main body portion 41.

As shown in FIG. 4, the inside holder 73 includes a locking member 731, as an example of a first member engaged with the core body main body portion 41 of the core body 4 to lock the core body main body portion 41 to the inside holder 73, and a pressing member 732, as an example of a second member abutting against the pressure sensing device 71 to transmit a pressure applied to the core body 4 to the pressure sensing device 71, as will be described later.

The locking member 731 has a cylindrical external shape. The locking member 731 is formed of a hard resin, for example, a POM resin or polycarbonate. The outside diameter R2 of the cylindrically shaped portion of the locking member 731 is smaller than the diameter R1 of the first housing space 721 of the outside holder 72, so that the locking member 731 is movable in the axial direction within the first housing space 721 without rubbing against the inner wall of the first housing space 721 of the outside holder 72.

A recessed hole 7311 into which to insert the core body main body portion 41 is formed in the axial direction in a central portion of the locking member 731 which central portion is on the side of the core body main body portion 41 in the axial direction. The recessed hole 7311 has a cylindrical shape whose diameter is slightly larger than the outside diameter of the core body main body portion 41. Formed in an inner wall surface at a predetermined position in the axial direction of the recessed hole 7311 of the cylindrical shape is an annular projecting portion 7312 projecting from the inner wall surface to the space of the recessed hole 7311 in the shape of an arc in the present example.

On the other hand, as shown in FIG. 4, an annular projecting portion 411 projecting in the shape of an arc in the present example is formed at a predetermined position of an end portion of the core body main body portion 41 in the direction orthogonal to the axial direction. The annular projecting portion 7312 of the recessed hole 7311 and the annular projecting portion 411 of the core body main body portion 41 are formed at the predetermined positions of the recessed hole 7311 and the core body main body portion 41 so as to satisfy engagement conditions as follows.

The core body main body portion 41 is inserted into the recessed hole 7311 of the locking member 731 of the inside holder 73 through the opening 723 of the outside holder 72. Then, when the annular projecting portion 411 of the core body main body portion 41 has gone over the annular projecting portion 7312 of the recessed hole 7311, a tip surface 41a of the core body main body portion 41 abuts against a bottom portion 7311a of the recessed hole 7311. Then, in the abutting state in which the tip surface 41a of the core body main body portion 41 abuts against the bottom portion 7311a of the recessed hole 7311, the engagement of the annular projecting portion 7312 with the annular projecting portion 411 locks the core body main body portion 41 within the recessed hole 7311 of the locking member 731. In this case, the core body main body portion 41 maintains the state of being locked within the recessed hole 7311 of the locking member 731 unless the core body main body portion 41 is extracted with a predetermined force.

Incidentally, because the tip surface 41a of the core body main body portion 41 is engaged with the bottom portion 7311a of the recessed hole 7311 so as to abut against the bottom portion 7311a of the recessed hole 7311 when the annular projecting portion 411 of the core body main body portion 41 has gone over the annular projecting portion 7312 of the recessed hole 7311, the core body main body portion 41 is prevented from rattling in the axial direction within the recessed hole 7311. In order to realize this, a distance between the annular projecting portion 7312 and the bottom portion 7311a of the recessed hole 7311 is set larger than a distance between the tip surface 41a and the annular projecting portion 411 of the core body main body portion 41 by an amount of distance for the annular projecting portion 411 to go over the annular projecting portion 7312.

In this case, the core body main body portion 41 may be press-fitted into the locking member 731 of the inside holder 73 as in the example in related art which example is shown in FIGS. 19A and 19B. However, when the core body main body portion 41 is press-fitted, there is a problem of not being able to see easily how far the core body main body portion 41 may be press-fitted into the recessed hole 7311 of the locking member 731. In addition, in the case of the constitution in which the core body main body portion 41 is press-fitted into the locking member 731, there is another problem of a necessity to strictly control the dimensions of the diameter of the core body main body portion 41 and the diameter of the recessed hole 7311 of the locking member 731 in order to obtain a fitting force by a frictional force between the locking member 731 and the core body main body portion 41.

Further, when the core body main body portion 41 is press-fitted, the locking member 731 of the inside holder 73 having the recessed hole 7311 into which to press-fit the core body main body portion 41 is generally provided with slits in the axial direction to facilitate the press-fitting. In that case, the locking member 731 of the inside holder 73 bulges in the direction orthogonal to the axial direction. Therefore, the outer wall surface of the locking member 731 of the inside holder 73 comes into contact with the inner wall surface of the outside holder 72. When a pen pressure is applied to the core body 4 and the pressing force displaces the locking member 731 of the inside holder 73 to the side of the pressure sensing device 71, a frictional force may occur between the outside holder 72 and the locking member 731 of the inside holder 73, so that the pen pressure may not be applied to the pressure sensing device 71 correctly.

On the other hand, in the above-described embodiment, the core body main body portion 41 is not press-fitted into the recessed hole 7311 of the locking member 731 of the inside holder 73, but the core body main body portion 41 is locked to the locking member 731 by the engagement of the annular projecting portions 411 and 7312 with each other. Thus, the problem of the press-fitting as described above does not occur.

That is, in the present embodiment, a so-called click feeling occurs when the core body main body portion 41 is inserted into the recessed hole 7311 of the locking member 731 of the inside holder 73 and the annular projecting portion 411 of the core body main body portion 41 goes over the annular projecting portion 7312 of the recessed hole 7311. It is thus possible to sense sensuously that the core body main body portion 41 is securely engaged with the recessed hole 7311 of the locking member 731.

The core body main body portion 41 is locked to the recessed hole 7311 of the locking member 731 in engagement relation in which the annular projecting portion 411 of the core body main body portion 41 has gone over the annular projecting portion 7312 of the recessed hole 7311. Thus, the diameter of the core body main body portion 41 and the diameter of the recessed hole 7311 of the locking member 731 do not need to be as exact as in the case of the press-fitting. Because the locking member 731 does not bulge in the direction orthogonal to the axial direction unlike the case of the press-fitting, there occurs no friction due to the contact of the outer wall surface of the locking member 731 of the inside holder 73 with the inner wall surface of the outside holder 72. Therefore a pen pressure applied to the core body 4 is correctly transmitted to the pressure sensing device 71.

Description will next be made of the pressing member 732 as an example of the second member of the inside holder 73. The pressing member 732 in the present embodiment is formed by an elastic member. The elastic member forming the pressing member 732 is, for example, a silicon resin, particularly a silicon rubber in the present example, which has a lower elastic modulus (modulus of elasticity), that is, a higher elasticity, than a material for the locking member 731 as the first member.

A projecting portion projecting in a projection shape from an end surface in the axial direction of a cylindrical base portion 7321 of the pressing member 732, or a cylindrical projecting portion 7322 having a smaller diameter than the cylindrical base portion 7321 in the present example, is formed on the end surface in the axial direction of the cylindrical base portion 7321. An axially recessed portion 7321a is formed in a central portion of an end surface of the cylindrical base portion 7321 of the pressing member 732, which end surface is on an opposite side from the side where the cylindrical projecting portion 7322 is formed.

A recessed portion 7313 in which the cylindrical base portion 7321 of the pressing member 732 is fitted is formed in a side in the axial direction of the locking member 731 as an example of the first member of the inside holder 73 which side is opposed to the pressure sensing device 71. A projecting portion 7314 fitted into the recessed portion 7321a of the cylindrical base portion 7321 of the pressing member 732 is formed in the recessed portion 7313.

As shown in FIG. 4, when the cylindrical base portion 7321 of the pressing member 732 is inserted into the recessed portion 7313 of the locking member 731, the recessed portion 7321a of the cylindrical base portion 7321 is fitted to the projecting portion 7314 of the recessed portion 7313 of the locking member 731, and thus the pressing member 732 is coupled to the locking member 731. At this time, an end surface of the cylindrical projecting portion 7322 formed on the end surface of the cylindrical base portion 7321 of the pressing member 732 faces the side of the pressure sensing device 71 housed in the second housing space 722 to be able to abut against the pressure sensing device 71. In this case, the position of a center of the end surface of the cylindrical projecting portion 7322 formed on the end surface of the cylindrical base portion 7321 of the pressing member 732 coincides with the position of a center line of the inside holder 73.

The inside holder 73 is formed by fitting and coupling the pressing member 732 to the locking member 731 as described above. As shown in FIG. 4, the inside holder 73 is set in a state of abutting against the pressure sensing device 71 to be described later with the cylindrical projecting portion 7322 formed in the pressing member 732 projecting in a projection shape from the end surface of the locking member 731.

Description will next be made of the pressure sensing device 71 housed in the second housing space 722 of the outside holder 72. FIGS. 7A to 7D are diagrams of assistance in explaining the pressure sensing device 71 in the present example.

As shown in FIG. 7A, the pressure sensing device 71 includes a semiconductor chip 80 that forms a capacitance type pressure sensing portion and a socket 710 that houses the semiconductor chip 80 and which is provided with the above-described metallic terminal pieces 71a and 71b.

FIG. 7C is a sectional view of the semiconductor chip 80. FIG. 7D is a plan view of the semiconductor chip 80 as viewed from a direction of application of a pressure P shown in FIG. 7C. FIG. 7C is a sectional view taken along a line B-B in FIG. 7D.

The semiconductor chip 80 in the present example detects a pressure applied to the semiconductor chip 80 as a change in capacitance. The semiconductor chip 80 in the present example has a constitution as shown in FIG. 7C. As shown in FIG. 7D, the semiconductor chip 80 in the present example has the shape of a rectangular parallelepiped whose longitudinal length L and lateral length L are 1.5 mm and whose height H is 0.5 mm, for example. As shown in FIG. 7C, the semiconductor chip 80 in the present example includes a first electrode 81, a second electrode 82, and an insulating layer (dielectric layer) 83 between the first electrode 81 and the second electrode 82. The first electrode 81 and the second electrode 82 in the present example are formed by a conductor made of single crystal silicon (Si).

In the present example, on the side of a surface of the insulating layer 83, which surface is opposed to the first electrode 81, a circular recessed portion 84 is formed which has, as a center thereof, the central position of the surface. This recessed portion 84 forms a space 85 between the insulating layer 83 and the first electrode 81. A bottom surface of the recessed portion 84 in the present example is a flat surface, whose diameter D is for example D=1 mm. The depth of the recessed portion 84 in the present example is a few ten microns to a few hundred microns.

The presence of the space 85 allows the first electrode 81 to be displaced so as to be bent in a direction of the space 85 when pressed from the side of an upper surface 81a on an opposite side from a surface opposed to the second electrode 82. The thickness t of the single crystal silicon as an example of the first electrode 81 is such a thickness as to allow the bending due to the applied pressure P, and is smaller than the thickness of the second electrode 82.

In the semiconductor chip 80 as an example of a pressure sensing chip having the constitution as described above, a capacitance Cd is formed between the first electrode 81 and the second electrode 82. When a pressure is applied to the first electrode 81 from the side of the upper surface 81a of the first electrode 81, which upper surface is on the opposite side from the surface opposed to the second electrode 82, the first electrode 81 is displaced so as to be bent to the side of the space 85, a distance between the first electrode 81 and the second electrode 82 is shortened, and thus the value of the capacitance Cd is changed so as to increase. An amount of bending of the first electrode 81 changes according to the magnitude of the applied pressure. The capacitance Cd is therefore a variable capacitance in accordance with the magnitude of the pressure P applied to the semiconductor chip 80. Incidentally, the single crystal silicon illustrated as the first electrode 81 is bent by a few microns by the pressure P. According to the pressure P that causes the bending, the capacitance Cd exhibits a change of 0 to 10 pF (picofarads).

The socket 710 is formed of a resin, for example, and has a flat shape as shown in FIGS. 7A and 7B. The metallic terminal pieces 71a and 71b are fixed to the socket 710 by resin molding, as described above.

The socket 710 has a housing recessed portion 711 for housing the semiconductor chip 80 having the constitution as described above in a front surface portion on an opposite side from a surface from which the metallic terminal pieces 71a and 71b are led out. A terminal plate 712 formed at an end portion of the metallic terminal piece 71b, which end portion is on the opposite side from the bent portion described above, is formed so as to be exposed in a bottom portion of the housing recessed portion 711. Incidentally, the terminal plate 712 in the bottom portion of the housing recessed portion 711 may of course be electrically connected to the metallic terminal piece 71b instead of being a part of the metallic terminal piece 71b.

In addition, a terminal plate 713 formed at an end portion of the metallic terminal piece 71a, which end portion is on the opposite side from the bent portion described above, is formed so as to be exposed in a part of a peripheral surface of the housing recessed portion 711 in the front surface of the socket 710. Incidentally, the terminal plate 713 may also of course be electrically connected to the metallic terminal piece 71a instead of being a part of the metallic terminal piece 71a.

The semiconductor chip 80 having, for example, a conductive adhesive adhering to the second electrode 82 is housed within the housing recessed portion 711 of the socket 710 such that the side of the second electrode 82 is on the side of the bottom portion of the housing recessed portion 711. In this housed state, the second electrode 82 of the semiconductor chip 80 and the terminal plate 712 are electrically connected to each other, that is, the second electrode 82 and the metallic terminal piece 71b are electrically connected to each other.

In the housed state in which the semiconductor chip 80 is housed within the housing recessed portion 711, the first electrode 81 of the semiconductor chip 80 is exposed to the front surface side. The exposed first electrode 81 of the semiconductor chip 80 and the terminal plate 713 exposed at a predetermined position of the periphery of the housing recessed portion 711 are soldered and connected to each other by a metallic wire 86, as shown in FIG. 7B. The first electrode 81 of the semiconductor chip 80 and the metallic terminal piece 71a are thereby electrically connected to each other.

As described above, the pressure sensing device 71 is formed by housing the semiconductor chip 80 in the housing recessed portion 711 of the socket 710.

In the present example, locking pawls 714 and 715 having projecting portions 714a and 715a (the projecting portion 715a is omitted in FIGS. 7A and 7B) projecting in an upward direction and a downward direction, respectively, are formed in an upper position and a lower position that interpose the housing recessed portion 711 in the front surface of the socket 710 of the pressure sensing device 71.

On the other hand, as shown in FIG. 4, openings 725a and 725b to be engaged with the projecting portions 714a and 715b of the locking pawls 714 and 715 of the socket 710 of the pressure sensing device 71 are formed in an upper wall surface and a lower wall surface of the part of the second housing space 722 in the outside holder 72.

The pressure sensing device 71 is inserted from the opening side of the second housing space 722 of the outside holder 72 into the second housing space 722 of the outside holder 72 so that the first electrode 81 of the semiconductor chip 80 abuts against the cylindrical projecting portion 7322 of the pressing member 732. Then, the projecting portions 714a and 715b of the locking pawls 714 and 715 of the socket 710 are engaged with the openings 725a and 725b of the outside holder 72, whereby the pressure sensing device 71 is housed and fixed within the second housing space 722 of the outside holder 72. In this housed and fixed state, the upper surface 81a of the first electrode 81 of the semiconductor chip 80 housed and retained in the pressure sensing device 71 abuts against the tip surface of the cylindrical projecting portion 7322 of the pressing member 732.

In this state, the central position of the tip surface of the cylindrical projecting portion 7322 of the pressing member 732 coincides with the central position of the circular space 85 under the first electrode 81 of the semiconductor chip 80. The cylindrical projecting portion 7322 of the pressing member 732 has a diameter of 0.7 mm. The circular space 85 under the first electrode 81 has a diameter of 1 mm. The diameter of the cylindrical projecting portion 7322 of the pressing member 732 is thus smaller than the diameter of the circular space 85. Incidentally, the dimensions of the diameter of the cylindrical projecting portion 7322 of the pressing member 732 and the diameter of the circular space 85 are an example. However, a relation is to be maintained such that the diameter of the cylindrical projecting portion 7322 of the pressing member 732 is smaller than the diameter of the circular space 85.

Incidentally, in the present embodiment, a plurality of ribs (ridges) in a direction along the axial direction, or six ribs (ridges) 722a, 722b, 722c, 722d, 722e, and 722f in the present example, are formed on the inner wall surface of the second housing space 722 of the outside holder 72. These ribs 722a to 722f are to regulate the position of the pressure sensing device 71 in the second housing space 722 of the outside holder 72. Specifically, the ribs 722a to 722f regulate the position of the pressure sensing device 71 by abutting against the outer circumferential side surface of the socket 710 of the pressure sensing device 71 such that the central position of the circular space 85 under the first electrode 81 of the semiconductor chip 80 housed in the pressure sensing device 71 coincides with the central position of the tip surface of the cylindrical projecting portion 7322 of the pressing member 732.

Incidentally, the plurality of ribs 722a to 722f may be provided on the outer circumferential side surface of the socket 710 of the pressure sensing device 71 instead of being provided on the inner wall surface of the second housing space 722 of the outside holder 72.

In the constitution of the variable capacitance type pen pressure detecting mechanism part in related art which has been described with reference to FIGS. 19A and 19B, the elastically deformable conductive member is pressed against the dielectric, and the area of contact between the dielectric and the conductive member is changed according to a pressure applied to the core body, whereby capacitance is made variable. Therefore the position of a point of application of the pressure to the conductive member is not much of a problem.

However, the pressure-capacitance changing characteristic of the pressure sensing portion formed by the semiconductor chip 80 is varied unless a pressure is applied at the central position of the circular space 85 interposed between the first electrode and the second electrode opposed to each other. In this respect, in the pen pressure detecting module 7 according to the above-described embodiment, a desired pressure-capacitance changing characteristic can be obtained easily because the coincidence between the central position of the circular space 85 under the first electrode 81 of the semiconductor chip 80 housed in the pressure sensing device 71 and the central position of the tip surface of the cylindrical projecting portion 7322 of the pressing member 732 is ensured.

Incidentally, retaining pieces 726 and 727 (see FIG. 4 and FIG. 3A) that retain the terminal leading member 9 coupled to the ferrite core 6 by sandwiching the terminal leading member 9 from both sides are formed in both side surface portions of the outside holder 72, which side surface portions are opposed to each other, in such a manner as to project to the side of the terminal leading member 9. Projecting portions 726a and 726b (see FIG. 3A) are formed in surfaces of tip portions of the retaining pieces 726 and 727, which surfaces are opposed to each other, each of the projecting portions 726a and 727a being formed so as to project in a direction of the surface in which the other is formed. On the other hand, recessed grooves into which to fit the projecting portions 726a and 727a of the retaining pieces 726 and 727 are formed in side portions of the terminal leading member 9, respectively.

The terminal leading member 9 is inserted between the retaining pieces 726 and 727 of the outside holder 72, and the projecting portions 726a and 727a are fitted into the recessed grooves respectively, whereby the terminal leading member 9 is engaged with and retained by the outside holder 72, and is coupled to the outside holder 72. The coil module 5M is thereby coupled to the pen pressure detecting module 7.

In the position indicator 1 according to the first embodiment having the constitution as described above, when a pen pressure is applied to the core body 4, the locking member 731 of the inside holder 73 which locking member 731 is engaged with the core body main body portion 41 of the core body 4 in the pen pressure detecting module 7 is displaced to the side of the semiconductor chip 80 of the pressure sensing device 71 within the outside holder 72 in the axial direction according to the applied pen pressure. The pressing member 732 fitted in the locking member 731 therefore bends the first electrode 81 of the semiconductor chip 80 of the pressure sensing device 71 to the side of the second electrode 82 with the space 85 interposed between the first electrode 81 and the second electrode 82. The capacitance Cd of a capacitor formed between the first electrode 81 and the second electrode 82 of the semiconductor chip 80 thereby changes according to the pen pressure. The change in the capacitance Cd changes the resonance frequency of the resonance circuit of the position indicator 1. The position detecting device 202 detects the change in the resonance frequency. The position detecting device 202 thereby detects the pen pressure applied to the core body 4 of the position indicator 1.

Circuit Constitution for Position Detection and Pen Pressure Detection by Position Detecting Device 202 in First Embodiment An example of a circuit constitution of the position detecting device 202 of the electronic apparatus 200, which position detecting device 202 detects an indicated position and detects a pen pressure using the position indicator 1 according to the above-described first embodiment, will next be described with reference to FIG. 8. FIG. 8 is a block diagram showing an example of circuit constitution of the position indicator 1 and the position detecting device 202 included in the electronic apparatus 200.

The position indicator 1 includes a resonance circuit formed by the coil 5, the capacitors 12 and 13, and the capacitor (capacitance Cd) formed by the semiconductor chip 80. As shown in FIG. 8, this resonance circuit is formed by connecting the coil 5 as an inductance element, the trimmer capacitor 12 formed by a chip part, and the capacitor (capacitance Cd) formed by the semiconductor chip 80 in parallel with each other, and further connecting, in parallel, a series circuit of the side switch 11 and the capacitor 13 as a chip part.

In this case, according to the turning on and off of the side switch 11, the connection of the capacitor 13 to the parallel resonance circuit is controlled, and thus the resonance frequency is changed. A change in the capacitance Cd of the capacitor formed by the semiconductor chip 80 in accordance with a pen pressure applied to the capacitor (capacitance Cd) formed by the semiconductor chip 80 also changes the resonance frequency according to the pen pressure. The position detecting device 202 detects the change in the frequency by detecting a change in phase of a signal from the position indicator 1, and thereby detects whether or not the side switch 11 is pressed and detects the pen pressure applied to the core body 4 of the position indicator 1.

The position detecting device 202 of the electronic apparatus 200 has a position detecting coil 210 formed by stacking an X-axis direction loop coil group 211 and a Y-axis direction loop coil group 212. The position detecting device 202 also has a selecting circuit 213 connected with the X-axis direction loop coil group 211 and the Y-axis direction loop coil group 212. The selecting circuit 213 sequentially selects one loop coil of the two loop coil groups 211 and 212.

The position detecting device 202 further includes an oscillator 231, a current driver 232, a switching connecting circuit 233, a receiving amplifier 234, a detector 235, a low-pass filter 236, a sample and hold circuit 237, an ND (Analog to Digital) converter circuit 238, a synchronous detector 239, a low-pass filter 240, a sample and hold circuit 241, an A/D converter circuit 242, and a processing control section 243. The processing control section 243 is formed by a microcomputer.

The oscillator 231 generates an alternating-current signal of a frequency f0. The oscillator 231 then supplies the generated alternating-current signal to the current driver 232 and the synchronous detector 239. The current driver 232 converts the alternating-current signal supplied from the oscillator 231 into a current, and sends out the current to the switching connecting circuit 233. The switching connecting circuit 233 selects a connection destination (a transmitting side terminal T or a receiving side terminal R) to which to connect the loop coil selected by the selecting circuit 213, under control of the processing control section 243. Of the connection destinations, the transmitting side terminal T is connected with the current driver 232, and the receiving side terminal R is connected with the receiving amplifier 234.

An induced voltage generated in the loop coil selected by the selecting circuit 213 is sent to the receiving amplifier 234 via the selecting circuit 213 and the switching connecting circuit 233. The receiving amplifier 234 amplifies the induced voltage supplied from the loop coil, and sends out the amplified induced voltage to the detector 235 and the synchronous detector 239.

The detector 235 detects the induced voltage generated in the loop coil, that is, a received signal, and sends out the received signal to the low-pass filter 236. The low-pass filter 236 has a cutoff frequency sufficiently lower than the above-mentioned frequency f0. The low-pass filter 236 converts the output signal of the detector 235 into a direct-current signal, and sends out the direct-current signal to the sample and hold circuit 237. The sample and hold circuit 237 holds a voltage value of the output signal of the low-pass filter 236 in predetermined timing, specifically predetermined timing during a receiving period, and sends out the voltage value to the ND (Analog to Digital) converter circuit 238. The A/D converter circuit 238 converts the analog output of the sample and hold circuit 237 into a digital signal, and outputs the digital signal to the processing control section 243.

Meanwhile, the synchronous detector 239 performs synchronous detection of the output signal of the receiving amplifier 234 with the alternating-current signal from the oscillator 231, and sends out a signal having a level corresponding to a phase difference between the output signal of the receiving amplifier 234 and the alternating-current signal from the oscillator 231 to the low-pass filter 240. The low-pass filter 240 has a cutoff frequency sufficiently lower than the frequency f0. The low-pass filter 240 converts the output signal of the synchronous detector 239 into a direct-current signal, and sends out the direct-current signal to the sample and hold circuit 241. The sample and hold circuit 241 holds a voltage value of the output signal of the low-pass filter 240 in predetermined timing, and sends out the voltage value to the ND (Analog to Digital) converter circuit 242. The A/D converter circuit 242 converts the analog output of the sample and hold circuit 241 into a digital signal, and outputs the digital signal to the processing control section 243.

The processing control section 243 controls various parts of the position detecting device 202. Specifically, the processing control section 243 controls the selection of a loop coil in the selecting circuit 213, the switching of the switching connecting circuit 233, and the timing of the sample and hold circuits 237 and 241. The processing control section 243 makes a radio wave transmitted from the X-axis direction loop coil group 211 and the Y-axis direction loop coil group 212 for a certain transmission duration on the basis of the input signals from the A/D converter circuits 238 and 242.

A radio wave transmitted from the position indicator 1 generates an induced voltage in each of loop coils of the X-axis direction loop coil group 211 and the Y-axis direction loop coil group 212. The processing control section 243 calculates the coordinate values of an indicated position in the X-axis direction and the Y-axis direction which position is indicated by the position indicator 1 on the basis of the level of the voltage value of the induced voltage generated in each of the loop coils. In addition, the processing control section 243 detects whether or not the side switch 11 is depressed and detects a pen pressure on the basis of the level of a signal corresponding to a phase difference between the transmitted radio wave and the received radio wave.

Thus, in the position detecting device 202, the processing control section 243 can detect the position of the position indicator 1 that has approached the position detecting device 202. In addition, by detecting the phase (frequency shift) of the received signal, the processing control section 243 can detect whether or not the depression operating element 16 of the side switch 11 is depressed in the position indicator 1, and detect the pen pressure applied to the core body 4 of the position indicator 1.

As described above, the pen pressure detecting module in the position indicator 1 according to the above-described embodiment has a simple constitution formed by the outside holder 72 as an example of the first holder, the inside holder 73 as an example of the second holder, and the pressure sensing device 71 including the semiconductor chip 80 as a capacitance type pressure sensing portion. The pen pressure detecting module is thus suitable for mass production.

The pressure sensing device 71 including the semiconductor chip 80 is miniaturized easily, and the inside holder 73 disposed within the hollow portion of the outside holder 72 needs only to be engaged with the core body main body portion 41. There is no need for a coil spring nor an electrode whose shape is devised so as to be elastically displaced as in the pen pressure detecting mechanism section in related art, which mechanism section is shown in FIGS. 19A and 19B. The outside holder 72 as an example of the first holder and the inside holder 73 as an example of the second holder are thus thinned easily. Therefore the position indicator can be made thinner.

In addition, the engagement of the core body main body portion 41 with the inside holder 73 is realized by the engagement of the projecting portions with each other, and not by press-fitting as in the example in related art. Thus, a state of engagement of the core body main body portion 41 with the inside holder 73 is checked easily, and problems of dimensional accuracy and deformation of the inside holder 73 due to press-fitting can be avoided.

Modification of First Embodiment

Other Examples of Engagement Relation of Core Body Main Body Portion 41 with Recessed Hole 7311 of Locking Member 731 of Inside Holder 73

In the above-described first embodiment, the core body main body portion 41 of the core body 4 is provided with the annular projecting portion 411, and the recessed hole 7311 of the locking member 731 of the inside holder 73 is provided with the annular projecting portion 7312. The annular projecting portion 411 of the core body main body portion 41 and the annular projecting portion 7312 of the recessed hole 7311 are engaged with each other when the annular projecting portion 411 of the core body main body portion 41 goes over the annular projecting portion 7312 of the recessed hole 7311. However, the engagement of the core body main body portion 41 with the locking member 731 is not limited to the engagement of the projecting portions with each other as in the above-described example.

Specifically, FIG. 9A shows a first other example of a state of engagement of the core body main body portion 41 with the locking member 731. In the first example, an annular dent portion 412 is formed in the core body main body portion 41 in place of the annular projecting portion. The annular dent portion 412 formed in the core body main body portion 41 is fitted to the annular projecting portion 7312 formed in the recessed hole 7311 of the locking member 731 of the inside holder 73. Therefore, in the first example, a distance between the annular projecting portion 7312 and the bottom portion 7311*a* in the recessed hole 7311 of the locking member 731 is equal to a distance between the annular dent portion 412 and the tip surface 41*a* of the core body main body portion 41. The other constitution is similar to that of the example of the foregoing first embodiment.

The first example is different from the example of the foregoing first embodiment only in terms of the state of engagement of the core body main body portion 41 with the locking member 731. The first example produces exactly the same action and effect to those of the example of the foregoing first embodiment. In the first example, the engagement between the annular dent portion 412 of the core body main body portion 41 and the annular projecting portion 7312 of the recessed hole 7311 of the locking member 731 can be confirmed by a click feeling when the annular dent portion 412 of the core body main body portion 41 is fitted to the annular projecting portion 7312 of the recessed hole 7311 of the locking member 731.

Next, FIG. 9B shows a second other example of a state of engagement of the core body main body portion 41 with the locking member 731. In the second example, the relation between the annular projecting portion and the annular dent portion in the foregoing first example is reversed between the side of the core body main body portion 41 and the side of the recessed hole 7311 of the locking member 731.

Specifically, as shown in FIG. 9B, in the second example, as in the example of the foregoing first embodiment shown in FIG. 4, the annular projecting portion 411 is formed in the core body main body portion 41. On the other hand, an annular dent portion 7315 is formed in the recessed hole 7311 of the locking member 731. Also in the second example, as in the first example, a distance between the annular dent portion 7315 and the bottom portion 7311*a* in the recessed hole 7311 of the locking member 731 is equal to a distance between the annular projecting portion 411 and the tip surface 41*a* of the core body main body portion 41.

In the second example, the state of engagement of the core body main body portion 41 with the locking member 731 is similar to that of the first example. The action and effect of the second example are exactly the same as those of the above-described first example.

Incidentally, in the above examples, the engaging portions formed in the core body main body portion 41 and the recessed hole 7311 of the locking member 731 are annular projecting portions or annular dent portions. However, the engaging portions do not need to be of an annularly continuous shape as long as a projecting portion can be engaged with a projecting portion by going over the projecting portion, or a projecting portion can be engaged with a dent portion by being fitted to the dent portion. Discontinuous projecting portions and discontinuous dent portions formed by dividing an annular projecting portion and an annular dent portion, respectively, into a plurality of pieces may be provided.

Other Examples of Constitution of Inside Holder 73

In the description of the foregoing first embodiment, the inside holder 73 includes the locking member 731 as an example of the first member and the pressing member 732 as an example of the second member, and the locking member 731 and the pressing member 732 are fitted to each other. However, the pressing member 732 may be formed integrally with the locking member 731.

Specifically, FIG. 10A shows a first example in which the pressing member 732 is formed integrally with the locking member 731. In the present example, the inside holder 73 is formed by only a locking member 7310. Hence, a recessed portion for fitting the pressing member 732 is not formed in the locking member 7310. A cylindrical projecting portion 7316 in a projection shape corresponding to the cylindrical projecting portion 7322 formed in the pressing member 732 in the above-described example is formed on an end surface of the locking member 7310 which end surface is on an opposite side from the side of the recessed hole 7311.

Hence, in the example of FIG. 10A, the cylindrical projecting portion 7316 forming an integral member with the locking member 731 abuts against the first electrode of the semiconductor chip 80 retained by the pressure sensing device 71. Incidentally, an elastic body may be interposed between the cylindrical projecting portion 7316 and the first electrode 81 of the semiconductor chip 80. The elastic body may be for example attached to the tip surface of the cylindrical projecting portion 7316, or attached to the first electrode 81 of the semiconductor chip 80.

FIG. 10B shows a second other example of the inside holder 73. In the present example, a pressing member portion 7320 formed by an elastic body which pressing member portion 7320 corresponds to the pressing member 732 is formed by two-color molding. Specifically, a locking member 731 formed of a hard resin such as POM, polycarbonate, or the like, which locking member 731 has the recessed hole 7311 and the recessed portion 7313, is molded first, and thereafter a pressing member portion 7320 formed by an elastic body such as a silicon resin, for example a silicon rubber is molded in the recessed portion 7313. A cylindrical projecting portion 7323 in a projection shape is formed in the pressing member portion 7320. This cylindrical projecting portion 7323 abuts against the first electrode 81 of the semiconductor chip 80 of the pressure sensing device 71.

Other Examples of Shape of Projection-Shaped Projecting Portion on End Surface of Inside Holder 73 which End Surface is on Side of Pressure Sensing Device 71

In the above-described embodiment, the projecting portion in a projection shape on the end surface of the inside holder 73 which end surface is on the side of the pressure sensing device 71, that is, the cylindrical projecting portion 7322 provided in the pressing member 732 and the projecting portions 7316 and 7323 shown in FIGS. 10A and 10B, have a flat tip surface. However, the shape of the tip surfaces of these projection-shaped projecting portions is not limited to this.

For example, FIGS. 11A and 11B are examples applied to the pressing member 732. In the example of FIG. 11A, a cylindrical projecting portion 7324 whose tip surface has a tapered shape is formed on the pressing member 732. In the example of FIG. 11B, a cylindrical projecting portion 7325 whose tip surface has the shape of a hemispherical or domed curved surface is formed on the pressing member 732.

The characteristic of the capacitance of the semiconductor chip 80 with respect to applied pressure can be varied by changing the shape of the projection-shaped projecting portion on the end surface of the inside holder 73 which end surface is on the side of the pressure sensing device 71 as in the examples of FIGS. 11A and 11B. It is to be noted that the shape of the projection-shaped projecting portion on the end surface of the inside holder 73 which end surface is on the side of the pressure sensing device 71 is not limited to the examples of FIGS. 11A and 11B, but can be various other shapes according to desired characteristics as the characteristic of the capacitance of the semiconductor chip 80 with respect to applied pressure.

In addition, while the projection-shaped projecting portion in the foregoing embodiment is cylindrical, the projection-shaped projecting portion is not limited to a cylindrical shape, but may be a polygonal shape. In addition, the projection-shaped projecting portion on the end surface of the inside holder 73 which end surface is on the side of the pressure sensing device 71 is not limited to the projecting portion formed in the pressing member 732, but the examples as shown in FIGS. 11A and 11B are applicable also to the shape of the tip surfaces of the projecting portions 7316 and 7323 in FIGS. 10A and 10B.

Other Examples of Pressure Transmitting Member

In the foregoing embodiment, the pressure transmitting member is the core body 4 itself. However, the pressure transmitting member is not limited to the core body 4 as long as the pressure transmitting member can transmit a pressure applied to the core body 4 to the pressure sensing device 71.

FIG. 12 shows an example of the pressure transmitting member. In the present example, a core body 43 is coupled to one end of a ferrite core 60 on which the coil 5 is wound by fitting a projecting portion 43a formed in the core body 43 into a recessed portion 60a formed on one end of the ferrite core 60. A recessed portion 60b is also formed on another end of the ferrite core 60. A projecting portion 44a formed in one end portion of a rod-shaped pressure transmitting member 44 engaged with the pen pressure detecting module 7 is fitted into the recessed portion 60b, whereby the pressure transmitting member 44 is coupled to the ferrite core 60.

In the present example, a projecting portion 44b such as the annular projecting portion formed in the core body main body portion 41 described above or the like is formed in an end portion of the pressure transmitting member 44. One terminal 5a and the other terminal 5b of the coil 5 wound around the ferrite core 60 in the present example are extended as wires to the printed board, and soldered to the printed board, as in related art.

Second Embodiment

The pen pressure detecting module in the foregoing first embodiment includes the first holder, the second holder housed within the first holder, and the pressure sensing device. On the other hand, a pen pressure detecting module in a second embodiment includes one holder and a pressure sensing device.

FIG. 13 is a diagram showing an example of constitution of the pen pressure detecting module in the second embodiment. In FIG. 13, the same parts as in the constitution of the pen pressure detecting module 7 in the foregoing first embodiment are identified by the same reference symbols, and detailed description thereof will be omitted.

In the second embodiment, one holder 74 and a pressure sensing device 71 having exactly the same constitution as the above-described constitution form a pen pressure detecting module 70. In addition, as shown in FIG. 13, a core body main body portion 41 of a core body 4 in the present example is also an example of a pressure transmitting member. However, it is needless to say that the constitution as shown in FIG. 12 may be adopted.

A recessed hole 741 into which to insert the core body main body portion 41 of the core body 4 and a recessed portion 742 forming a housing space housing the pressure sensing device 71 are formed in the holder 74. The recessed hole 741 and the recessed portion 742 communicate with each other. Openings 743a and 743b to be engaged with locking pawls 714 and 715 formed on a socket 710 of the pressure sensing device 71 are formed in an upper wall and a lower wall of the recessed portion 742. In addition, also in the second embodiment, a plurality of ribs (only a rib 742a is shown in FIG. 13) for regulating the position of the pressure sensing device 71 when the pressure sensing device 71 is inserted into the recessed portion 742 are formed on an inner wall of the recessed portion 742.

The recessed hole 741 in the second embodiment is formed in a similar manner to the recessed hole 7311 of the locking member 731 in the foregoing first embodiment. In the present example, an annular projecting portion 7411 is formed in the recessed hole 741.

In the second embodiment, the pressure sensing device 71 is inserted into the recessed portion 742, and the locking pawls 714 and 715 are fitted into the openings 743a and 743b, whereby the pressure sensing device 71 is locked to the recessed portion 742 of the holder 74.

Then, the core body main body portion 41 of the core body 4 is inserted into the recessed hole 741. When an annular projecting portion 411 of the core body main body portion 41 goes over the annular projecting portion 7411 of the recessed hole 741, a tip surface 41a of the core body main body portion 41 abuts against the surface of a first electrode 81 of a semiconductor chip 80 of the pressure sensing device 71. The holder 74 is fixed to a board holder 3, and is formed so as not to be moved or displaced in an axial direction.

Hence, in the second embodiment, when a pen pressure is applied to the core body 4, the tip surface 41a of the core body main body portion 41 presses the first electrode 81 of the semiconductor chip 80 to change the capacitance Cd. The other action and effect are similar to those of the first embodiment.

The second embodiment needs only one holder, and thus has a very simple constitution. The one holder enables to the pen pressure detecting module to be made thinner. In addition, as in the first embodiment, when the core body main body portion 41 is inserted into the recessed hole 741 of the holder 74, a click feeling is obtained by engagement between the annular projecting portions 411 and 7411, and therefore it can be confirmed that the core body main body portion 41 is securely engaged with the holder 74.

Modifications of Second Embodiment

Also in the second embodiment, as in the foregoing first embodiment, modifications can be made to the engagement relation between the pressure transmitting member and the holder.

Specifically, FIGS. 14A and 14B correspond to the modifications in FIGS. 9A and 9B in the first embodiment. FIG. 14A represents a case where an annular dent portion 412 is formed in the core body main body portion 41 in place of the annular projecting portion 411. In the present example, as in the first embodiment, the annular dent portion 412 is fitted to the annular projecting portion 7411' of the recessed hole 741. Thus, as in the first embodiment, the depth of the recessed hole 741 is smaller than that of the recessed hole 741 in the example of FIG. 13.

In the second embodiment, the core body main body portion 41 itself is displaced so as to press the first electrode 81 of the semiconductor chip 80, whereas the holder 74 is fixed to the board holder 3, and cannot be moved or displaced. Therefore, in the example of FIG. 14A in the second embodiment, the length in the axial direction of the annular dent portion 412 of the core body main body portion 41 which annular dent portion 412 is fitted to the annular projecting portion 7411 is made larger than the length in the axial direction of the annular projecting portion 7411 by an amount of displacement of the core body main body portion 41.

The example of FIG. 14B represents a case where an annular projecting portion 411 is formed in the core body main body portion 41 and an annular dent portion 7412 is formed in the holder 74. Also in the present example, in the second embodiment, the length in the axial direction of the annular dent portion 7412 of the recessed hole 741, which annular dent portion 7412 is fitted with the annular projecting portion 411 of the core body main body portion 41, is made larger than the length in the axial direction of the annular projecting portion 411 by an amount of displacement of the core body main body portion 41.

In the above description of the second embodiment, the tip surface 41a of the core body main body portion 41 directly abuts against the surface of the first electrode 81 of the semiconductor chip 80 of the pressure sensing device 71. However, an elastic body may be interposed between the core body main body portion 41 and the surface of the first electrode 81 of the semiconductor chip 80 of the pressure sensing device.

FIG. 15A shows a first example in which an elastic body is interposed. An elastic body 413 such as a silicon resin, for example, is provided to the tip surface 41a of the core body main body portion 41. The elastic body 413 is formed on the tip surface 41a of the core body main body portion 41 by a two-color molding method, for example.

Incidentally, the elastic body 413 may be bonded to the tip surface 41a of the core body main body portion 41 rather than being formed by two-color molding, or though not shown in the figures, a projecting portion may be provided to one of the tip surface 41a of the core body main body portion 41 and the elastic body 413, a recessed portion may be provided to the other, and the tip surface 41a of the core body main body portion 41 and the elastic body 413 may be fitted to each other.

FIG. 15B shows a second example in which an elastic body is interposed. An elastic body 87 formed of a silicon resin, for example, is bonded to the central position of the surface of the first electrode 81 of the semiconductor chip 80 of the pressure sensing device 71 by an adhesive, for example.

In each of the examples of FIGS. 15A and 15B, a pen pressure applied to the core body 4 is transmitted to the surface of the first electrode of the semiconductor chip 80 of the pressure sensing device via the core body main body portion 41 and the elastic body 413 or the elastic body 87. Hence, the changing characteristic of the capacitance Cd of the semiconductor chip 80 with respect to applied pen pressure can be varied by changing the elastic modulus of the elastic body 413 or the elastic body 87 or the shape of the tip surface of the elastic body 413 or the elastic body 87, for example.

Incidentally, in each of the examples of FIGS. 15A and 15B, the modifications described with reference to FIGS. 9A and 9B in the first embodiment are applicable to a relation as to whether to form a projecting portion or a dent portion as each of the engaging portion formed in the core body main body portion 41 and the engaging portion formed in the recessed hole 741 of the holder 74.

Incidentally, also in the second embodiment, the pressure transmitting member is not limited to the core body 4, but may be any member as long as the member can transmit a pen pressure applied to the core body 4, as shown in FIG. 12, for example.

In addition, as in the first embodiment, the projecting portion and the dent portion formed in the core body main body portion 41 and the recessed hole 741 of the holder 74 do not need to be an annular projecting portion and an annular dent portion, but may be formed by a plurality of discontinuous projecting portions and discontinuous dent portions.

In addition, the projecting portion and the dent portion formed in the core body main body portion 41 and the recessed hole 741 of the holder 74 in the above description may have the sectional shape of an arc. However, the sectional shape of the projecting portion and the dent portion is not limited to this. For example, as shown in FIG. 16, a projecting portion 414 having a triangular sectional shape may be formed in the core body main body portion 41, and a projecting portion 7413 also having a triangular sectional shape may be formed in the recessed hole 741 of the holder 74. It is needless to say that this is applicable not only to the second embodiment but also to the projecting portion and the dent portion formed in the core body main body portion 41 and the recessed hole 7311 of the locking member 731 of the inside holder 73 in the first embodiment.

Third Embodiment

The above description has been made in a case where the present disclosure is applied to an electromagnetic induction type position indicator. However, the present disclosure is applicable also to a capacitance type position indicator.

FIG. 17 is a diagram showing an embodiment of a capacitance type position indicator according to the present disclosure. The capacitance type position indicator 1B in the present example has a structure formed by screwing a sleeve 1001 to a tip side of a case 1000 formed of a conductor such as a metal, for example. An opening for exposing a core body 1002 to the outside is provided in the sleeve 1001. A tip of the core body 1002 is formed so as to project from the opening to the outside.

In this case, the core body 1002 is formed of a conductor of a metal, for example. A tip portion of the core body 1002 is covered with an elastic cap 1003 formed of a conductive member. The inside of the sleeve 1001 is covered with a conductive member 1004 that is in contact with the cap 1003 put on the core body 1002 and which is thus electrically connected to the cap 1003. The core body 1002 and the case 1000 are thereby electrically connected to each other.

The case 1000 of the position indicator 1B houses a pen pressure detecting module 7B having the same constitution as the pen pressure detecting module described in the foregoing first embodiment or the foregoing second embodiment, and houses a pen pressure signal transmitting section 1010. An end portion of the core body 1002, which end portion is on an opposite side from the side that projects to the outside, is fitted into the pen pressure detecting module 7B as in the foregoing embodiments. The pen pressure detecting module 7B detects a pen pressure applied to the core body 1002 by the capacitance Cd of a capacitor formed by a semiconductor chip 80.

The pen pressure signal transmitting section 1010 includes an IC 1011 and a transmitting circuit 1012 for performing radio transmission by a short-range radio communication system such as a Bluetooth (registered trademark) standard, for example. The semiconductor chip 80 of the pen pressure detecting module 7B is connected to the IC 1011 of the pen pressure signal transmitting section 1010. The IC 1011 generates a pen pressure detection signal on the basis of the capacitance Cd of the variable capacitance capacitor formed by the semiconductor chip 80, and supplies the pen pressure detection signal to the transmitting circuit 1012. The transmitting circuit 1012 transmits, by radio, the pen pressure signal received from the IC 1011 to a position detecting device.

FIG. 18 is a diagram of assistance in explaining a position detecting device 2000 used in conjunction with the position indicator 1B in the third embodiment. The position detecting device 2000 includes a sensor section 2010, a pen pressure signal receiving section 2201, and a control circuit 2002.

As is well known, at a position at which the position indicator 1B is in contact with or in proximity to an input operating surface 2010a, a charge flows through the position indicator 1B and a human body to a ground (earth). Thus, the sensor section 2010 detects the position at which the position indicator 1B is in contact with or in proximity to the input operating surface 2010a on the basis of a difference of a capacitance at the position at which the position indicator 1B is in contact with or in proximity to the input operating surface 2010a from a capacitance at other positions. The sensor section 2010 supplies a detected position signal (position coordinates on the input operating surface) to the control circuit 2002.

The pen pressure signal receiving section 2201 receives the pen pressure signal from the position indicator 1B, and supplies the pen pressure signal to the control circuit 2002. The control circuit 2002 receives the position signal from the sensor section 2010 and the pen pressure signal from the pen pressure signal receiving section 2201, generates a display control signal, and supplies the display control signal to a display device formed by Liquid Crystal Display (LCD) disposed so as to be superposed on the sensor section 2010. The position indicated by the position indicator 1B is displayed with a line width or a density in accordance with the pen pressure on the screen of the display device.

The position indicator 1B according to the third embodiment does not include a ferrite core wound with a coil. Thus, for example, the core body 1002 formed of a metal is directly inserted into an engaging recessed hole of the pen pressure detecting module 7B. Of course, a pressure transmitting member separate from the core body 1002 may be coupled to the core body 1002, and the pressure transmitting member may be inserted into the engaging recessed hole of the pen pressure detecting module 7B.

Other Embodiments or Modifications

The outside holder 72 (in the first embodiment) and the holder 74 (in the second embodiment) of the pen pressure detecting modules in the foregoing embodiments are fixed so as not to be movable in the axial direction with respect to the case main body 2a of the position indicator. However, a cartridge type constitution, in which all of the parts of the position indicator are housed within a predetermined thin, cylindrical case, and the case is housed within the case main body 2a as in a case of a so-called refill, is also possible as a constitution of the position indicators according to the first embodiment and the second embodiment. The present disclosure is also applicable to cases where a pen pressure detecting module is housed within a thin, cylindrical case of the cartridge type.

It should be understood by those skilled in the art that various modifications, combinations, sub-combinations and alterations may occur depending on design requirements and other factors insofar as they are within the scope of the appended claims or the equivalents thereof.

What is claimed is:

1. A pen pressure detecting module dimensioned to be housed within a case of a position indicator, a pressure transmitting member being disposed within the case of the position indicator, the pen pressure detecting module comprising:
    a first holder, the first holder being different from the case of the position indicator and an outer diameter of the first holder being smaller than an inner diameter of the case;
    a second holder; and
    a pressure sensing device including
        a first electrode, and
        a second electrode disposed so as to be opposed to the first electrode at a predetermined distance from the first electrode, a capacitance being formed between the first electrode and the second electrode,
    the pressure sensing device sensing a pressure applied to the second holder that is transmitted to the first electrode based on a change in the capacitance, the change in the capacitance being caused by a displacement of the first electrode in correspondence with the pressure;
    the first holder having a hollow portion formed with a cylindrical inner shape, the second holder being housed in the hollow portion, and the pressure sensing device being disposed so as to sense the pressure applied to the second holder that is transmitted to the first electrode;
    the first holder having a first opening at a first end of the first holder and a second opening at a second end of the first holder, the first end being opposite the second end, an inner diameter of the first opening being larger than an outer diameter of the second holder, an inner diameter of the second opening being smaller than the outer diameter of the second holder;

the second holder having an engaging portion to be engaged with the pressure transmitting member to which the pressure is applied, the engaging portion having a recessed portion into which the pressure transmitting member is insertable in an axial direction of the second holder, the second opening being adjacent to the recessed portion.

2. The pen pressure detecting module according to claim 1, wherein the engaging portion of the second holder has a locking portion that is detachably lockable to the pressure transmitting member and the en a in portion is provided in an inner circumferential surface of the recessed portion.

3. The pen pressure detecting module according to claim 2, wherein the locking portion provided in the inner circumferential surface of the recessed portion has a projecting portion, the pressure transmitting member has a projecting portion at a predetermined position and is insertable into the recessed portion, and, while the pressure transmitting member is inserted the recessed portion and the projecting portion of the pressure transmitting member abuts the projecting portion of the second holder and is engaged with the projecting portion of the second holder, the second holder is locked to the pressure transmitting member.

4. The pen pressure detecting module according to claim 2, wherein the locking portion provided in the inner circumferential surface of the recessed portion has a projecting portion or a dent portion, the pressure transmitting member has a dent portion or a projecting portion corresponding to the projecting portion or the dent portion of the locking portion at a predetermined position and is insertable into the recessed portion, and, while the pressure transmitting member is inserted into the recessed portion and the projecting portion or the dent portion of the locking member is engaged with the dent portion or the projecting portion of the pressure transmitting member, the second holder is locked to the pressure transmitting member.

5. The pen pressure detecting module according to claim 1, wherein an end portion of the second holder to which the pressure sensing device is opposed has a predetermined projection shape that transmits the pressure applied to the second holder to the first electrode of the pressure sensing device.

6. The pen pressure detecting module according to claim 5, wherein the end portion of the second holder having the projection shape abuts against the pressure sensing device to transmit the pressure to the pressure sensing device, and an area of the end portion of the second holder having the projection shape, the area abutting against the pressure sensing device, is smaller than an area of the first electrode disposed in the pressure sensing device.

7. The pen pressure detecting module according to claim 5, wherein the second holder has a first member and a second member, a pressure applied to the first member is transmitted to the second member, and the second member has the predetermined projection shape that transmits the pressure applied to the second member to the first electrode of the pressure sensing device.

8. The pen pressure detecting module according to claim 7, wherein the second member is partially housed in a recessed portion provided in an axial direction in the first member.

9. The pen pressure detecting module according to claim 7, wherein the second member has a lower elastic modulus than the first member.

10. The pen pressure detecting module according to claim 1, wherein the pressure sensing device is housed in a hollow portion formed in the first holder, and is disposed so as to sense the pressure applied to the second holder.

11. The pen pressure detecting module according to claim 10, wherein a rib that positions the pressure sensing device with respect to the first holder is formed on an inner surface of the hollow portion formed in the first holder, the pressure sensing device being housed in the hollow portion.

12. The pen pressure detecting module according to claim 1, wherein the pressure sensing device has a semiconductor chip and a socket, the socket housing the semiconductor chip and having a plurality of connecting terminals, the semiconductor chip has the first electrode and the second electrode, and has connecting portions connected to the first electrode and the second electrode, respectively, and provided so as to be exposed to an outside of the pressure sensing device, and the socket houses the semiconductor chip with the connecting portions of the semiconductor chip connected respectively to the connecting terminals of the socket.

13. The pen pressure detecting module according to claim 12, wherein the connecting portions of the semiconductor chip are provided respectively in an outer surface on a side on which the first electrode is formed and an outer surface on a side on which the second electrode is formed.

14. The pen pressure detecting module according to claim 13, wherein the connecting portion connected to the second electrode of the semiconductor chip has a larger area than an area of the connecting portion connected to the first electrode of the semiconductor chip, and the connecting portion connected to the second electrode of the semiconductor chip and the corresponding connecting terminal of the socket are electrically connected to each other by coming into contact with each other when the semiconductor chip is housed in the socket.

15. A position indicator having a shape of a pen and being capable of detecting a pressure applied to a tip portion of the position indicator, the position indicator comprising:
a housing;
a core body housed in the housing and having a first end projecting from the tip portion of the position indicator; and
a pen pressure detecting module housed in the housing and detecting a pressure applied to the core body;
the pen pressure detecting module including
a pressure sensing device including
a first electrode, and
a second electrode disposed so as to be opposed to the first electrode at a predetermined distance from the first electrode, a capacitance being formed between the first electrode and the second electrode,
the pressure sensing device sensing the pressure applied to the core body that is transmitted to the first electrode based on a change in the capacitance, the change in the capacitance being caused by a displacement of the first electrode in correspondence with the pressure applied to the core body that is transmitted to the first electrode,
a first holder, the first holder being different from the housing, and an outer diameter of the first holder being smaller than an inner diameter of the housing, and
a second holder,
the first holder having a hollow portion formed with a cylindrical inner shape, the second holder being housed in the hollow portion, and the pressure sensing device being disposed so as to sense a pressure applied to the second holder, the first holder having a first opening at a first end of the first holder and a second opening at a second end of the first holder, the first end being opposite the second end, an inner diameter of the first opening being larger than an outer diameter of the second holder, an inner diameter of the second opening smaller than the outer diameter of the second holder, the core body being disposed within the second opening, the second holder having an engaging portion that engages the core body and transmits the pressure applied to the core body to the second holder, the engaging portion having a recessed portion into which the core body is inserted in an axial direction of the second holder.

16. The position indicator according to claim 15, wherein the housing houses an inductance element forming a resonance circuit together with the pressure sensing device, and an electromagnetic induction signal is transmitted from the resonance circuit.

17. The position indicator according to claim 15, wherein the housing houses a pressure information transmitting circuit that transmits information regarding the pressure sensed by the pressure sensing device by radio wave transmission.

18. The position indicator according to claim 15, wherein a second end of the core body, the second end of the core body being different from the first end projecting from the tip portion of the position indicator, is inserted into the engaging portion formed in the second holder, and a pressure applied to the first end of the core body is transmitted to the pen pressure detecting module.

19. A pen pressure detecting module dimensioned to be housed within a case of a position indicator, a pressure transmitting member being disposed within the case of the position indica, the pen pressure detecting module comprising:

a pressure sensing device including
a first electrode, and
a second electrode disposed so as to be opposed to the first electrode at a predetermined distance from the first electrode, a capacitance being formed between the first electrode and the second electrode,
the pressure sensing device sensing a pressure transmitted to the first electrode based on a change in the capacitance, the change in the capacitance being caused by a displacement of the first electrode in correspondence with the pressure; and a holder including a hollow portion having a cylindrical inner shape dimensioned to at least partially house the pressure transmitting member to which the pressure is applied so as to transmit the pressure to the holder,
the holder being different from the case of the position indicator,
an outer diameter of the holder being smaller than an inner diameter of the case;
the holder including a first opening at a first end of the holder and a second opening at a second end of the holder, the first end being opposite the second end, an inner diameter of the first opening being larger than an inner diameter of second opening,
the pressure sensing device being disposed so as to sense the pressure applied to the pressure transmitting member that is transmitted to the first electrode;
the holder having, in an inner circumferential surface of the hollow portion thereof, an engaging portion having a recessed portion into which the pressure transmitting member is insertable in an axial direction of the holder, the second opening being adjacent to the recessed portion, and a locking portion that is detachably lockable to the pressure transmitting member.

20. The pen pressure detecting module according to claim 19, wherein the locking portion is provided in the inner circumferential surface of the holder and has a projecting portion, the pressure transmitting member has a projecting portion at a predetermined position that is insertable into the hollow portion formed in the holder, and, while the pressure transmitting member is inserted into the hollow portion and the projecting portion of the pressure transmitting member abuts the projecting portion provided in the inner circumferential surface of the holder and is engaged with the projecting portion provided in the inner circumferential surface of the holder, the holder is locked to the pressure transmitting member.

21. The pen pressure detecting module according to claim 19, wherein the locking portion is provided in the inner circumferential surface of the holder and has a projecting portion or a dent portion, the pressure transmitting member has a dent portion or a projecting portion corresponding to the projecting portion or the dent portion provided in the inner circumferential surface of the holder at a predetermined position and is insertable into the hollow portion formed in the holder, and, while the pressure transmitting member is inserted into the hollow portion and the projecting portion or the dent portion of the locking portion is engaged with the dent portion or the projecting portion of the pressure transmitting member, the holder is locked to the pressure transmitting member.

* * * * *

UNITED STATES PATENT AND TRADEMARK OFFICE
CERTIFICATE OF CORRECTION

PATENT NO. : 9,513,719 B2  
APPLICATION NO. : 14/259049  
DATED : December 6, 2016  
INVENTOR(S) : Masamitsu Ito et al.

Page 1 of 1

It is certified that error appears in the above-identified patent and that said Letters Patent is hereby corrected as shown below:

In the Claims

Column 31, Line 15:
"transmitting member and the en a in portion is provided in" should read, --transmitting member, and the engaging portion is provided in--.

Signed and Sealed this
Eighteenth Day of April, 2017

Michelle K. Lee
*Director of the United States Patent and Trademark Office*